(12) United States Patent
Takahashi et al.

(10) Patent No.: US 8,280,572 B2
(45) Date of Patent: Oct. 2, 2012

(54) SECONDARY BATTERY TEMPERATURE-INCREASING CONTROL APPARATUS, VEHICLE INCLUDING THE SAME, AND SECONDARY BATTERY TEMPERATURE-INCREASING CONTROL METHOD

(75) Inventors: Hidenori Takahashi, Okazaki (JP); Yuji Nishi, Nagoya (JP); Masatoshi Tazawa, Okazaki (JP); Masanobu Matsusaka, Handa (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 13/382,625

(22) PCT Filed: Jul. 7, 2010

(86) PCT No.: PCT/IB2010/001666
§ 371 (c)(1),
(2), (4) Date: Jan. 6, 2012

(87) PCT Pub. No.: WO2011/004247
PCT Pub. Date: Jan. 13, 2011

(65) Prior Publication Data
US 2012/0123626 A1   May 17, 2012

(30) Foreign Application Priority Data
Jul. 8, 2009   (JP) .................................. 2009-161922

(51) Int. Cl.
   *B60L 11/18* (2006.01)
(52) U.S. Cl. ......................................... 701/22; 320/109
(58) Field of Classification Search ........................ None
   See application file for complete search history.

(56) References Cited

U.S. PATENT DOCUMENTS

| 5,362,942 | A  | * | 11/1994 | Vanderslice et al. | 219/209 |
| 6,271,648 | B1 |   | 8/2001  | Miller | |
| 2002/0003417 | A1 | * | 1/2002 | Bito et al. | 320/152 |
| 2009/0067202 | A1 | * | 3/2009 | Ichikawa et al. | 363/79 |
| 2010/0085019 | A1 | * | 4/2010 | Masuda | 320/152 |

FOREIGN PATENT DOCUMENTS

| DE | 100 40 198 A1 | | 3/2001 |
| EP | 1 286 459 A1 | | 2/2003 |
| JP | 11-026032 A | | 1/1999 |
| JP | 2003-102133 | * | 4/2003 |
| JP | 2009-118729 | * | 5/2009 |
| JP | 2009-142069 A | | 6/2009 |

OTHER PUBLICATIONS

International Search Report and Written Opinion for corresponding International Patent Application No. PCT/IB2010/001666 mailed Apr. 12, 2011.

* cited by examiner

*Primary Examiner* — Michael J. Zanelli
(74) *Attorney, Agent, or Firm* — Sughrue Mion, PLLC

(57) ABSTRACT

A first calculating section (118) calculates an allowable output power (WoutA) of the secondary battery before a ripple temperature increase operation for increasing the temperature of a secondary battery by causing a ripple current to flow in the secondary battery is performed, the allowable output power being determined in advance based on the temperature and a state of charge (SOC) of the secondary battery. A second calculating section (120) calculates the allowable output power (WoutB) achieved when the ripple temperature increase operation is performed. A determining section (122) determines whether to perform the ripple temperature increase operation so that when the allowable output power (WoutB) is equal to or greater than the allowable output power (WoutA), the ripple temperature increase operation is performed and, when the allowable output power (WoutB) is smaller than the allowable output power (WoutA), the ripple temperature increase operation is not performed.

10 Claims, 16 Drawing Sheets

SECONDARY BATTERY TEMPERATURE-INCREASING CONTROL APPARATUS, VEHICLE INCLUDING THE SAME, AND SECONDARY BATTERY TEMPERATURE-INCREASING CONTROL METHOD

BACKGROUND OF THE INVENTION

1. Field of the Invention

The invention relates to a secondary battery temperature-increasing control apparatus, a vehicle including the same, and a secondary battery temperature-increasing control method. In particular, the invention relates to a technology for performing temperature increasing control to increase the temperature of the secondary battery with the use of the heat generation caused by the internal resistance of the secondary battery.

2. Description of the Related Art

In general, in secondary batteries, typified by lithium-ion batteries and nickel-hydrogen batteries, charging and discharging characteristics are degraded as the temperature decreases. When the temperature of the battery is low, it is required to quickly increase the temperature of the battery.

Japanese Patent Application Publication No. H11-26032 (JP-A-11-26032) describes an apparatus for healing up a battery for an electric vehicle. In this apparatus, the temperature of the battery is detected by a temperature sensor and a discharge controller performs control so that when the detected temperature is equal to or lower than a predetermined value, an output electric current greater than the requested electric current that the battery is requested to output is caused to flow.

It is insisted that with this heating up apparatus, it is possible to quickly increase the temperature of the battery to the inside thereof even in cold climate areas (see JP-A-11-26032).

In the above publication, however, neither the efficiency in increasing the temperature of the battery nor the state of the secondary battery after the temperature increase operation is performed is not discussed and it cannot be said that it is ensured that the optimum temperature increasing control is performed.

SUMMARY OF THE INVENTION

The invention provides a secondary battery temperature-increasing control apparatus capable of efficiently increasing the temperature of a secondary battery with the use of the heat generation caused by the internal resistance of the secondary battery, and provides a vehicle including such a secondary battery temperature-increasing control apparatus.

The invention also provides a secondary battery temperature-increasing control method, with which it is possible to efficiently increase the temperature of a secondary battery with the use of the heat generation caused by the internal resistance of the secondary battery.

A secondary battery temperature-increasing control apparatus according to a first aspect of the invention is a secondary battery temperature-increasing control apparatus for increasing a temperature of a secondary battery by controlling a ripple generating device configured to actively cause a ripple current to flow in the secondary battery, the secondary battery temperature-increasing control apparatus including first and second calculating sections and a determining section. The first calculating section calculates a first value (WoutA) indicating an allowable output power of the secondary battery before a temperature increase operation for increasing the temperature of the secondary battery is performed, the allowable output power (Wout) being determined in advance based on the temperature and a state of charge (SOC) of the secondary battery. The second calculating section calculates a second value (WoutB) indicating the allowable output power achieved when the temperature increase operation on the secondary battery is performed, based on the amount of variation in the temperature and the amount of variation in the SOC that occur when the temperature increase operation on the secondary battery is performed. The determining section determines whether to perform the temperature increase operation on the secondary battery so that when the second value is equal to or greater than the first value, the temperature increase operation on the secondary battery is performed by controlling the ripple generating device and, when the second value is smaller than the first value, the temperature increase operation on the secondary battery is not performed.

In the above first aspect, the secondary battery temperature-increasing control apparatus may further include a frequency selecting section that selects a frequency of the ripple current based on the second value.

In the above first aspect, the frequency selecting section may select a frequency, at which the second value becomes maximum, as the frequency of the ripple current.

In the above first aspect, the frequency selecting section may select a frequency, at which the second value when the temperature increase operation on the secondary battery is performed for a predetermined period of time becomes maximum, as the frequency of the ripple current.

In the above first aspect, the frequency selecting section may select a frequency, at which a peak value of the second value becomes maximum, as the frequency of the ripple current, and a time taken from when the temperature increase operation on the secondary battery is started to when the second value reaches the peak value may be set as a duration of the temperature increase operation on the secondary battery.

In the above first aspect, a configuration may be employed, in which an internal combustion engine can be started with an electric motor with the use of an electric power output from the secondary battery, and the frequency selecting section selects a frequency, at which it is ensured that the second value is equal to or higher than an electric power required to start the internal combustion engine, as the frequency of the ripple current.

In the above first aspect, the amount of variation in the temperature and the amount of variation in the SOC that occur when the temperature increase operation on the secondary battery is performed may be determined based on the frequency of the ripple current and a duration of the temperature increase operation on the secondary battery.

A vehicle according to a second aspect of the invention includes a secondary battery, a ripple generating device, and one of the secondary battery temperature-increasing control apparatuses described above. The secondary battery stores electric power to be used to drive the vehicle. The ripple generating device is connected to the secondary battery and is configured to actively cause a ripple current to flow in the secondary battery. The secondary battery temperature-increasing control apparatus increases a temperature of the secondary battery by controlling the ripple generating device.

A secondary battery temperature-increasing control method according to a third aspect of the invention is a secondary battery temperature-increasing control method of increasing a temperature of a secondary battery by controlling a ripple generating device configured to actively cause a ripple current to flow in the secondary battery, the secondary battery temperature-increasing control method including: calculating a first value (WoutA) indicating an allowable output power of the secondary battery before a temperature increase operation for increasing the temperature of the secondary battery is performed, the allowable output power (Wout) being determined in advance based on the temperature and a state of charge (SOC) of the secondary battery; calculating a second value (WoutB) indicating the allowable output power achieved when the temperature increase operation on the secondary battery is performed, based on the amount of variation in the temperature and the amount of variation in the SOC that occur when the temperature increase operation on the secondary battery is performed; and determining whether to perform the temperature increase operation on the secondary battery so that when the second value is equal to or greater than the first value, the temperature increase operation on the secondary battery is performed by controlling the ripple generating device and, when the second value is smaller than the first value, the temperature increase operation on the secondary battery is not performed.

In the above third aspect, the secondary battery temperature-increasing control method may further include selecting a frequency of the ripple current based on the second value.

In the above third aspect, in selecting the frequency of the ripple current, a frequency, at which the second value becomes maximum, may be selected as the frequency of the ripple current.

In the above third aspect, in selecting the frequency of the ripple current, a frequency, at which the second value when the temperature increase operation on the secondary battery is performed for a predetermined period of time becomes maximum, may be selected as the frequency of the ripple current.

In the above third aspect, in selecting the frequency of the ripple current, a frequency, at which a peak value of the second value becomes maximum, may be selected as the frequency of the ripple current, and the secondary battery temperature-increasing control method may further include setting a time taken from when the temperature increase operation on the secondary battery is started to when the second value reaches the peak value, as a duration of the temperature increase operation on the secondary battery.

In the above third aspect, a configuration may be employed, in which an internal combustion engine can be started with an electric motor with the use of an electric power output from the secondary battery, and in selecting the frequency of the ripple current, a frequency, at which it is ensured that the second value is equal to or higher than an electric power required to start the internal combustion engine, is selected as the frequency of the ripple current.

In the above third aspect, the amount of variation in the temperature and the amount of variation in the SOC that occur when the temperature increase operation on the secondary battery is performed may be determined based on the frequency of the ripple current and a duration of the temperature increase operation on the secondary battery.

In the invention, the temperature increase operation on the secondary battery is performed by controlling the ripple generating device configured to actively cause a ripple current to flow in the secondary battery. Determination is made so that when the second value (WoutB) indicating the allowable output power (Wout) achieved when the temperature increase operation on the secondary battery is performed is equal to or greater than the first value (WoutA) indicating the allowable output power before the temperature increase operation on the secondary battery is performed, the temperature increase operation on the secondary battery is performed by controlling the ripple generating device and when the second value is smaller than the first value, the temperature increase operation on the secondary battery is not performed. Thus, even when it is expected that the temperature of the secondary battery will be increased, the temperature increase operation on the secondary battery is not performed when the allowable output power will be reduced.

Thus, according to the invention, it is possible to efficiently increase the temperature of a secondary battery with the use of the heat generation caused by the internal resistance of the secondary battery.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
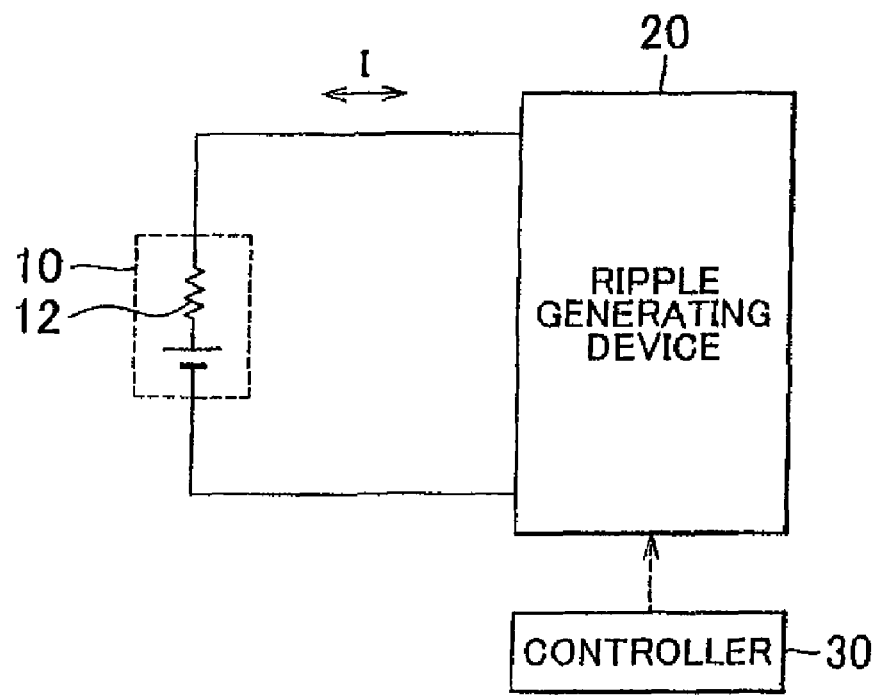
FIG. 1 is a diagram for explaining a secondary battery temperature-increasing method of the invention.

Embodiments of the invention will be described in detail below with reference to drawings. Note that the same or the corresponding portions in the drawings are designated by the same reference numeral and the description thereof is not repeated.

First Embodiment

FIG. 1 is a diagram for explaining a secondary battery temperature-increasing method of the invention. Referring to FIG. 1, the system includes a secondary battery 10, a ripple generating device 20, and a controller 30. The ripple generating device 20 is connected to the secondary battery 10.

The secondary battery 10 is a rechargeable battery, typified by a lithium ion battery or a nickel-hydrogen battery. The secondary battery 10 has an internal resistance 12. The internal resistance 12 has a temperature dependence and significantly varies depending also on the frequency of the electric current that flows in the battery as described later.

The ripple generating device 20 is controlled by the controller 30 and causes a ripple current I at a predetermined frequency to flow in the secondary battery 10. Thus, in the invention, a ripple current is caused to flow in the secondary battery to increase the temperature of the secondary battery from the inside thereof (such an operation for increasing temperature is hereinafter also referred to as "the ripple temperature increase operation"). For example, it is possible to cause the ripple current I to flow in the secondary battery 10 by turning on and off the power semiconductor switching devices, which are constituent elements of the ripple generating device 20.

The controller 30 controls the ripple generating device 20 so as to increase the temperature of the secondary battery 10 from the inside thereof by causing the ripple current I to flow in the secondary battery 10. The controller 30 controls the ripple generating device 20 so as to cause the ripple current I at a frequency within the range, in which the absolute value of the impedance of the secondary battery 10 is relatively low, to flow in the secondary battery 10, based on the frequency characteristics of the impedance of the secondary battery 10.

Figure 2:
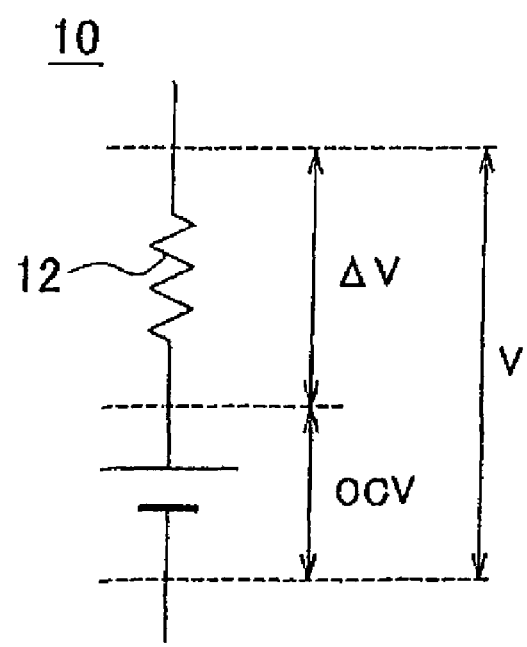
FIG. 2 is a diagram showing a breakdown of voltage of the secondary battery.

FIG. 2 is a diagram showing a breakdown of the voltage of the secondary battery 10. In FIG. 2, for the sake of simplicity, the internal resistance has the real part only and there is no imaginary part caused by L, C etc. Referring to FIG. 2, the voltage V generated between the terminals of the secondary battery 10 is obtained by adding or subtracting a voltage ΔV, generated across the internal resistance 12 during energization, to or from an open-circuit voltage OCV. Specifically, V=OCV+ΔV when the charging electric current flows, and V=OCV−ΔV when the discharging electric current flows (ΔV>0).

When the resistance value of the internal resistance 12 is R, the amount of heat Q generated when an electric current I flows in the secondary battery 10 is expressed by the following equation:

$$Q = I^2 \times R \quad (1)$$
$$= I \times \Delta V \quad (2)$$
$$= \Delta V^2 / R \quad (3)$$

These equations (1) to (3) are equivalent to each other. According to the equation (1), it seems that the temperature of the secondary battery 10 is effectively increased by increasing the ripple current I generated with the use of the ripple generating device 20. In actuality, however, with regard to the voltage V of the secondary battery, it is required to conform to the upper and lower limit voltage in view of the safety and the durability. In particular, under extremely low temperature conditions, the resistance value R of the internal resistance 12 increases and the voltage ΔV therefore increases, so that there is a possibility that a situation occurs where it becomes impossible to cause a sufficient ripple current I for generating heat to flow while the voltage V of the secondary battery 10 is restrained within the range between the upper and lower limits.

Specifically, under low temperature conditions (especially under extremely low temperature conditions), in which the resistance value R of the internal resistance 12 increases, there is a possibility that a situation occurs where the voltage ΔV becomes a restriction and makes it impossible to cause the ripple current I to flow in the secondary battery 10, which prevents the temperature of the secondary battery 10 from being effectively increased. Thus, focus is put on the equation (3) and the frequency characteristics of the impedance of the secondary battery 10 and the ripple current at a frequency within the range, in which the absolute value of the impedance of the secondary battery 10 (resistance value R of the internal resistance 12) is relatively lower as compared to the absolute value of the same impedance in the case of the frequency out of this range, is caused to flow by the ripple generating device 20. In this way, the heat generation amount Q in the secondary battery 10 increases and it becomes possible to effectively increase the temperature of the secondary battery 10.

Figure 3:
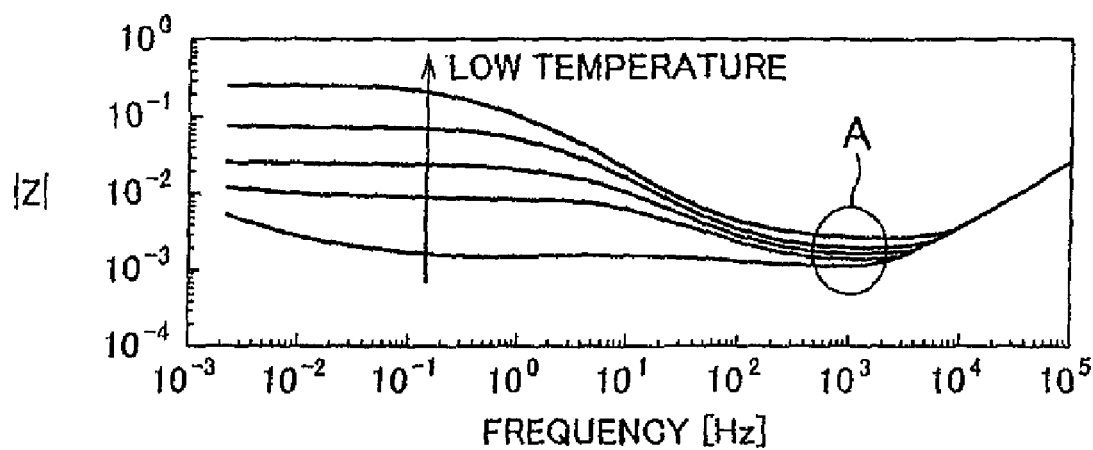
FIG. 3 is a Bode diagram showing impedance characteristics (absolute value) of the secondary battery.
Figure 4:
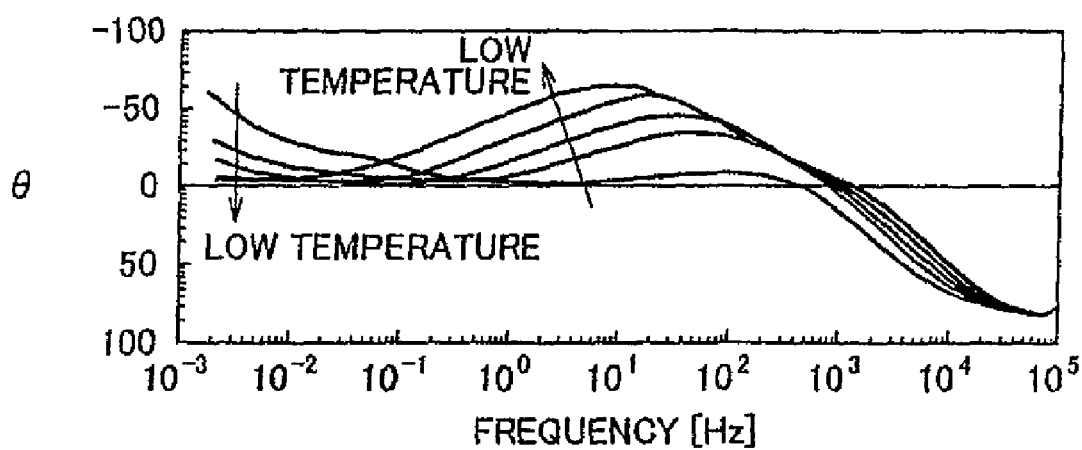
FIG. 4 is a Bode diagram showing impedance characteristics (phase) of the secondary battery.

FIGS. 3 and 4 are Bode diagrams showing the impedance characteristics of the secondary battery 10. As a method of analyzing the electrical characteristics of the secondary battery, the electrochemical impedance spectroscopy (BIS) is known. The Bode diagrams show the impedance characteristics of the secondary battery 10 with the use of the EIS. FIG. 3 shows the frequency characteristics of the absolute value |Z| of the impedance Z. FIG. 4 shows the frequency characteristics of the phase θ of the impedance Z.

In FIGS. 3 and 4, the horizontal axis, which is graduated logarithmically, indicates the frequency of the alternating current (ripple current) generated in the secondary battery 10. The vertical axis, which is graduated logarithmically, indicates the absolute value |Z| of the impedance Z in FIG. 3. The vertical axis indicates the phase θ of the impedance Z in FIG. 4.

As shown in FIG. 3, under low temperature conditions, in which it is required to increase the temperature of the secondary battery 10, the absolute value |Z| of the impedance Z increases as compared to that under non-low temperature conditions. However, such increase is significant when the frequency of the ripple current is low. In particular, around the frequency of 1 kHz, the absolute value |Z| of the impedance Z is smaller than that when the frequency is away from such a frequency range (around 1 kHz). In addition, even under extremely low temperature conditions, the absolute value is at most three times as high as that under the non-low temperature conditions (at room temperature, for example) (portion A in FIG. 3). In addition, as shown in FIG. 4, in such a frequency range (around 1 kHz), the phase θ of the impedance Z is near zero and therefore, the power factor is 1, which means good efficiency.

Thus, in the invention, based on the frequency characteristics of the impedance of the secondary battery 10, the ripple current at a frequency within the range (around 1 kHz based on FIG. 3, for example), in which the absolute value |Z| of the impedance Z of the secondary battery 10 is relatively low, is generated by the ripple generating device 20. In this way, it is possible to effectively cause the ripple current to flow in the secondary battery 10 even under the restriction imposed by the voltage ΔV generated across the internal resistance 12 of the secondary battery 10, so that the temperature of the secondary battery 10 is effectively increased.

Figure 5:
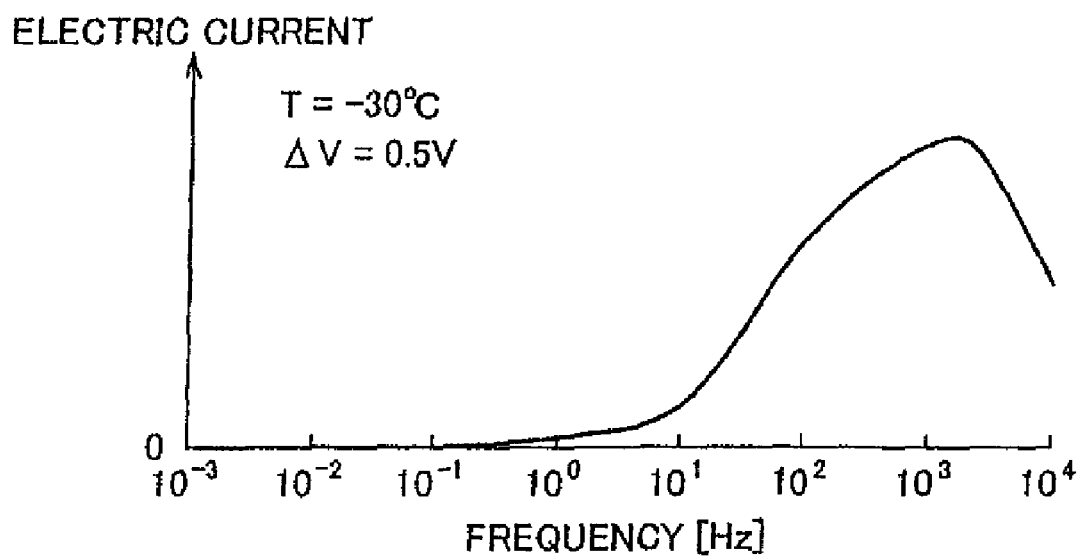
FIG. 5 is a diagram showing a peak value of a ripple current that can be caused to flow in the secondary battery under extremely low temperature conditions, where the voltage generated across an internal resistance is a constraint.

FIG. 5 is a diagram showing the peak value of the ripple current that can be caused to flow in the secondary battery 10 under extremely low temperature conditions, where the voltage ΔV generated across the internal resistance 12 of the secondary battery 10 is a constraint. Referring to FIG. 5, the horizontal axis indicates the frequency of the ripple current and the vertical axis indicates the peak value of the ripple current (assumed to be sinusoidal) that can be caused to flow in the secondary battery 10 under the constraint of the voltage ΔV. Note that a case is shown by way of example, in which the voltage ΔV equals 0.5V, and the temperature T of the secondary battery 10 equals −30° C. (extremely low temperature).

As shown in FIG. 5, within the frequency range (around 1 kHz), in which the absolute value of the impedance of the secondary battery 10 is relatively small, the electric current that can be caused to flow in the secondary battery 10 increases. When the frequency is low or the electric current is a direct current, if a constraint that the voltage ΔV=0.5 V is imposed, it is hardly possible to cause an electric current to flow in the secondary battery 10 to increase the temperature of the secondary battery.

Figure 6:
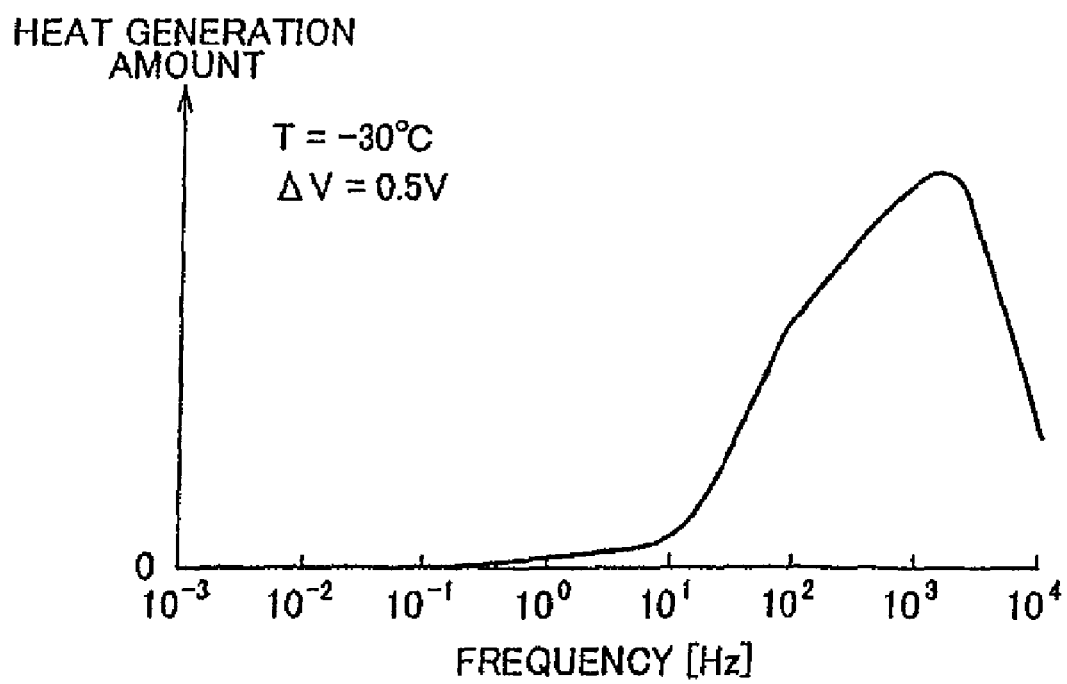
FIG. 6 is a diagram showing the average amount of heat that can be generated in the secondary battery under extremely low temperature conditions, where the voltage generated across the internal resistance is a constraint.

FIG. 6 is a diagram showing the average amount of heat that can be generated in the secondary battery 10 under extremely low temperature conditions, where the voltage ΔV generated across the internal resistance 12 of the secondary battery 10 is a constraint. Referring to FIG. 6, the horizontal axis indicates the frequency of the ripple current and the vertical axis indicates the average amount of heat generated in the secondary battery 10 in one cycle of the ripple. Note that also in FIG. 6, a case is shown by way of example, in which the voltage ΔV equals 0.5V, and the temperature T of the secondary battery 10 equals −30° C. (extremely low temperature).

As shown in MG. 6, the amount of heat generated by the secondary battery 10 increases within a frequency range (around 1 kHz), in which the absolute value of the impedance of the secondary battery 10 is relatively low. When the frequency is low or the electric current is a direct current, if a constraint that the voltage ΔV=0.5 V is imposed, it is hardly possible to cause an electric current to flow in the secondary battery 10 to increase the temperature of the secondary battery.

As described above, based on the frequency characteristics of the impedance of the secondary battery 10, the ripple current at a frequency within the range (around 1 kHz, for example), in which the absolute value of the impedance of the secondary battery 10 is relatively low, is caused to flow by the ripple generating device 20. In this way, it is possible to increase the heat generation amount Q of the secondary battery 10 and it is possible to effectively increase the temperature of the secondary battery 10.

Next, an example of a configuration of a system to which the secondary battery temperature-increasing control apparatus 1 according to the first embodiment of the invention is applied will be described.

Figure 7:
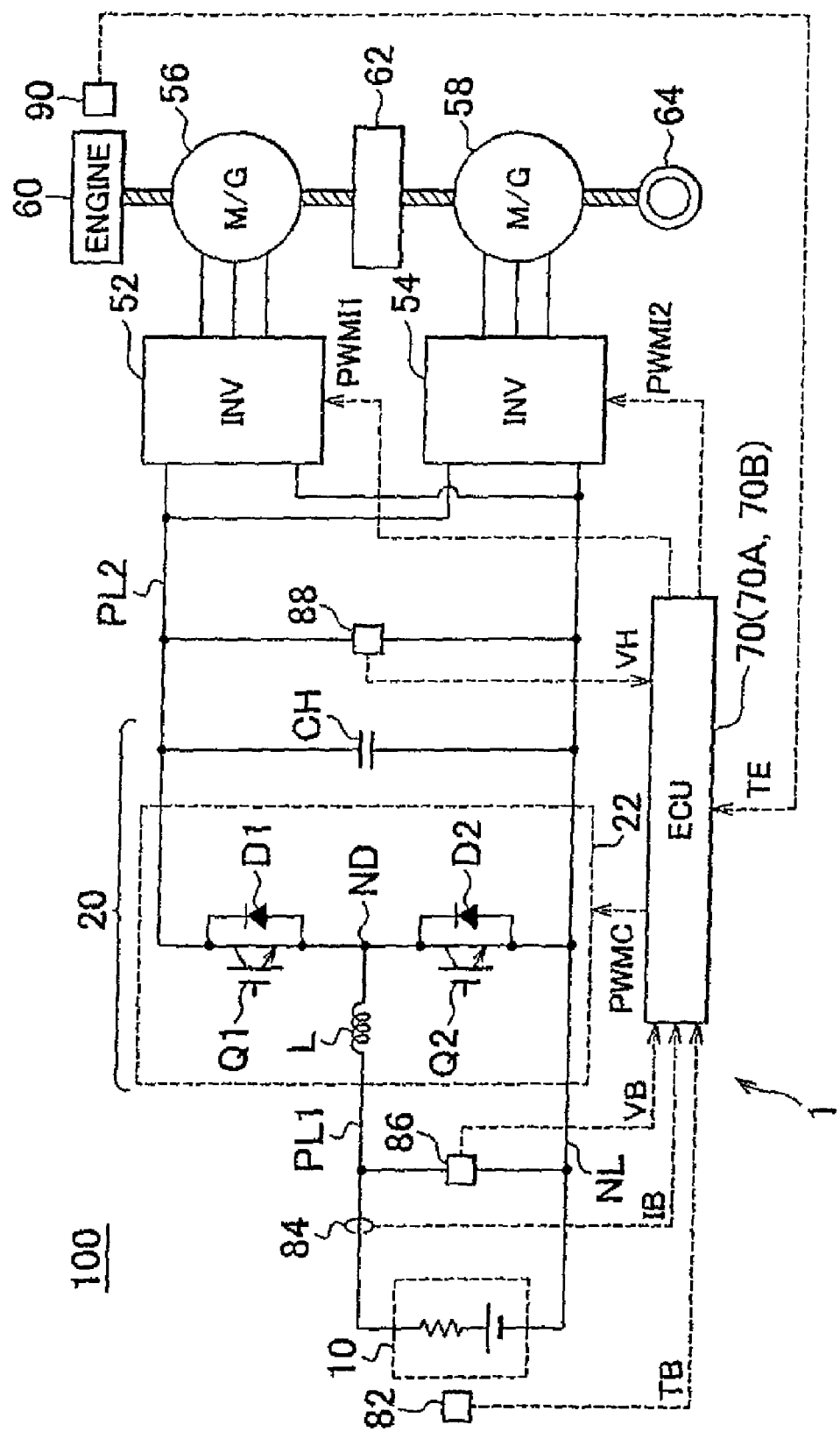
FIG. 7 is a block diagram of the whole of a hybrid vehicle, to which the secondary battery temperature-increasing control apparatus according to a first embodiment of the invention is applied.

FIG. 7 is a block diagram of the whole of a hybrid vehicle, to which the secondary battery temperature-increasing control apparatus 1 according to the first embodiment of the invention is applied. Referring to FIG. 7, the hybrid vehicle 100 includes the secondary battery 10, a boost converter 22, a capacitor CH, inverters 52 and 54, motor generators 56 and 58, an engine 60, a power splitting mechanism 62, and a driving wheel 64. The hybrid vehicle 100 further includes an electronic control unit (ECU) 70, temperature sensors 82 and 90, an electric current sensor 84, and voltage sensors 86 and 88.

The boost converter 22 includes power semiconductor switching devices (hereinafter also referred to merely as "the switching devices") Q1 and Q2, diodes D1 and D2, and a reactor L. The switching devices Q1 and Q2 are connected in series between a positive line PL2 and the negative line NL that is connected to the negative electrode of the secondary battery 10. A collector of the switching device Q1 is connected to the positive line PL2 and an emitter of the switching device Q2 is connected to the negative line NL. The diodes D1 and D2 are connected in anti-parallel to the switching devices Q1 and Q2, respectively. One terminal of the reactor L is connected to the positive line PL1 that is connected to the positive electrode of the secondary battery 10 and the other terminal thereof is connected to a node ND between the switching devices Q1 and Q2.

As the above switching devices Q1 and Q2, insulated gate bipolar transistors (IGBTs), power metal oxide semiconductor (MOS) transistors, etc. can be used, for example.

The boost converter 22 can boost the voltage between the positive line PL2 and the negative line NL (hereinafter also referred to as "the system voltage") to or above the output voltage of the secondary battery 10, based on a control signal PWMC from the ECU 70. When the system voltage is lower than the desired voltage, by increasing the duty factor of the switching device Q2, an electric current is caused to flow from the positive line PL1 to the positive line PL2, so that it is possible to raise the system voltage. Meanwhile, when the system voltage is higher than the desired voltage, by increasing the duty factor of the switching device an electric current is caused to flow from the positive line PL2 to the positive line PL1, so that it is possible to reduce the system voltage.

The boost converter 22 and the capacitor CH (described later) form the ripple generating device 20 shown in FIG. 1. When predetermined conditions for performing the ripple temperature increase operation are satisfied, the boost converter 22 causes a ripple current to flow in the secondary battery 10 by turning on and off the switching devices Q1 and Q2 based on the control signal PWMC from the ECU 70. More specifically, in the boost converter 22, the switching devices Q1 and Q2 are complementarily turned on and off according to the control signal PWMC, whereby the boost converter 22 causes a ripple current to flow in the secondary battery 10 depending on the switching frequency of the switching devices Q1 and Q2.

Figure 8:
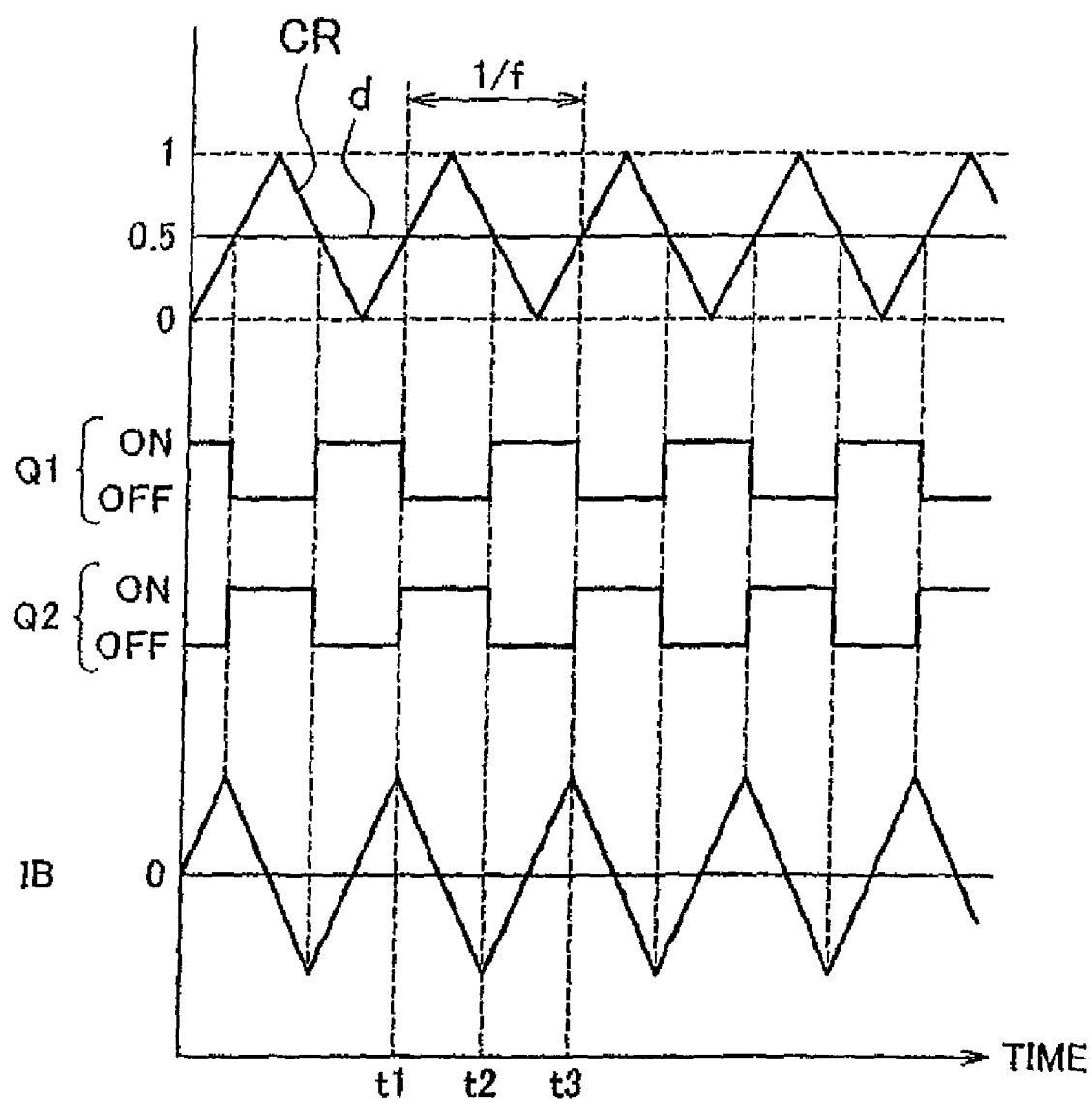
FIG. 8 is a diagram showing the ripple current caused to flow in the secondary battery by a boost converter.

FIG. 8 is a diagram showing the ripple current caused to flow in the secondary battery 10 by the boost converter 22.

Referring to FIG. 8, when the carrier signal CR of the boost converter 22 exceeds a duty command value d (=0.5) at time t1, the switching device Q1 of the upper arm is turned off and the switching device Q2 of the lower arm is turned on. When this occurs, the electric current IB (positive when the battery is being charged) that flows in the secondary battery 10 is reversed and increased in the negative direction. At the timing when the energy stored in the reactor L has been discharged, the sign of the electric current IB is turned from positive to negative.

When the carrier signal CR falls below the duty command value d at time t2, the switching device Q1 of the upper arm is turned on and the switching device Q2 of the lower arm is turned off. Then, the electric current IB is reversed and increased in the positive direction. At the timing when the energy stored in the reactor L has been discharged, the sign of the electric current IB is turned from negative to positive.

When the carrier signal CR again exceeds the duty command value d at time t3, the switching devices Q1 and Q2 are turned off and on, respectively. The electric current IB is again reversed and increased in the negative direction. In this way, the boost converter 22 causes a ripple current, depending on the switching frequency of the switching devices Q1 and Q2, to flow in the secondary battery 10.

Referring again to FIG. 7, the capacitor CH smoothes the voltage between the positive line PL2 and the negative line NL. The capacitor CH is used as an electric power buffer that temporarily stores the electric power output from the secondary battery 10 when the ripple temperature increase operation on the secondary battery 10 is performed.

The inverter 52, connected to the positive line PL2 and the negative line NL, drives the motor generator 56 based on the control signal PWMI1 from the ECU 70. The inverter 54, connected to the positive line PL2 and the negative line NL, drives the motor generator 58 based on the control signal PWMI2 from the ECU 70.

Each of the motor generators 56 and 58 is an alternating current motor, which is, for example, a three-phase alternating current motor provided with a rotor in which permanent magnets are embedded. The power splitting mechanism 62 is a planetary gear including a sun gear, pinions, a carrier, and a ring gear. The motor generators 56 and 58 and the engine 60 are connected to the power splitting mechanism 62. The power generated by the engine 60 is distributed to two paths by the power splitting mechanism 62. Specifically, one of these paths transmits the power to the driving wheel 64 and the other transmits the power to the motor generator 56.

The motor generator 56 generates electricity with the use of the power of the engine 60 distributed by the power splitting mechanism 62. When the remaining capacity (hereinafter also referred to as the "SOC (state of charge)" and represented by the value from 0% to 100% where the fully discharged state and the fully charged state are 0% and 100%, respectively) of the secondary battery 10 is reduced, the engine 60 is started and electricity is generated by the motor generator 56 to charge the secondary battery 10.

The motor generator 58 generates the driving power with the use of the electric power supplied through the positive line PL2. The driving power generated by the motor generator 58 is transmitted to the driving wheel 64. During braking of the vehicle, the motor generator 58 receives, from the driving wheel 64, the kinetic energy of the vehicle to generate electricity. Specifically, the motor generator 58 serves as a regenerative brake that converts the kinetic energy of the vehicle to electric power to obtain the braking force.

The temperature sensor 82 detects the temperature TB of the secondary battery 10 and outputs the detected value to the ECU 70. The electric current sensor 84 detects the electric current IB that is input to and output from the secondary battery 10 and outputs the detected value to the ECU 70. The sign of the electric current IB is hereinafter positive when the electric current IB flows in the direction such that the secondary battery 10 is charged. The voltage sensor 86 detects the voltage V13 between the positive line PL1 and the negative line NL, which corresponds to the output voltage of the secondary battery 10, and outputs the detected value to the ECU 70. The voltage sensor 88 detects the voltage VH between the positive line PL2 and the negative line NL and outputs the detected value to the ECU 70. The temperature sensor 90 detects the temperature TE of the engine 60 and outputs the detected value to the ECU 70.

The ECU 70 generates the control signal PWMC to drive the boost converter 22 based on the detected values of the voltages VB and VH received from the voltage sensors 86 and 88 and outputs the generated control signal PWMC to the boost converter 22.

When it is requested to perform the ripple temperature increase operation, the ECU 70 determines whether to perform the ripple temperature increase operation, by the method described later. Note that when the detected value of the temperature TB received from the temperature sensor 82 falls below a predetermined value, for example, it is requested to perform the ripple temperature increase operation. When it is determined to perform the ripple temperature increase operation, the ECU 70 controls the boost converter 22 to cause a ripple Current to flow in the secondary battery 10 to perform the ripple temperature increase operation on the secondary battery 10.

The ECU 70 generates the control signals PWMI1 and PWMI2 to drive the motor generators 56 and 58, respectively, and outputs the generated signals PWMI1 and PWMI2 to the inverters 52 and 54, respectively.

Next, the methodology for determining whether to perform the ripple temperature increase operation performed by the ECU 70 shown in FIG. 7, will be described.

Figure 9:
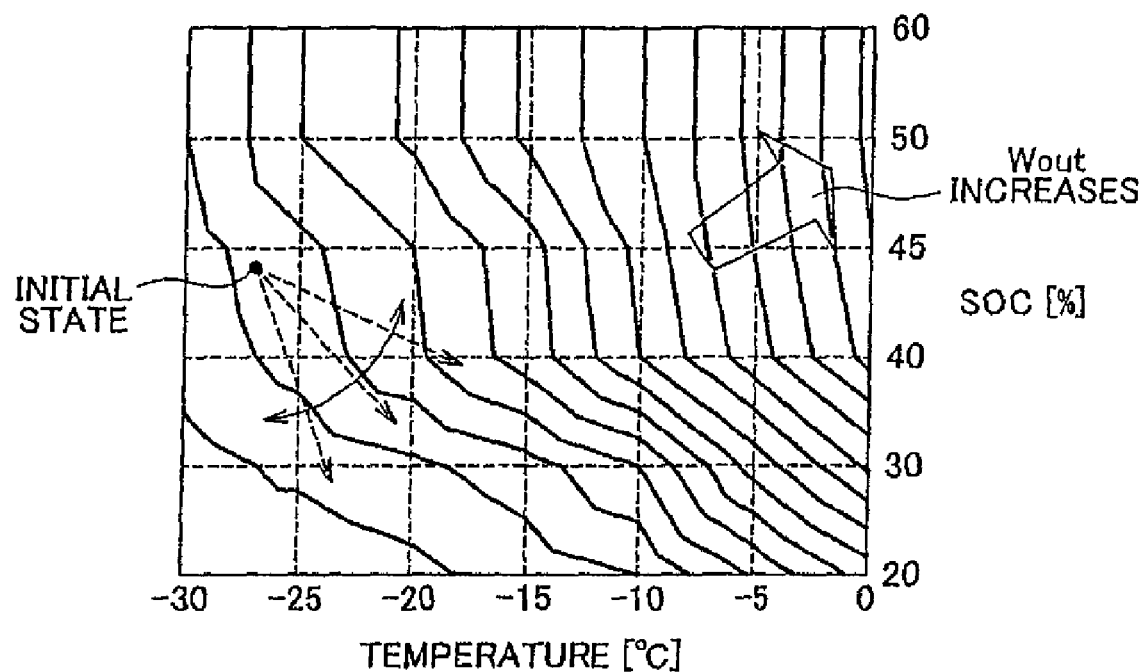
FIG. 9 is a diagram showing the allowable output power of the secondary battery.

FIG. 9 is a diagram showing the allowable output power Wout of the secondary battery 10. The allowable output power Wout is the electric power (kW) that the secondary battery 10 can output (discharge) in an instant. Referring to FIG. 9, the horizontal axis indicates the temperature (° C.) of the secondary battery 10 and the vertical axis indicates the SOC (%) of the secondary battery 10. In FIG. 9, the allowable output power Wout is equal on the same line, and the higher the temperature of the secondary battery 10 is and the higher the SOC is, the higher the allowable output power Wout is.

The point in FIG. 9 is an example of the state (initial state) of the secondary battery 10 before the ripple temperature increase operation is performed. The vectors represented by the dotted lines show the possibilities of the change in the state of the secondary battery 10 caused by the ripple temperature increase operation. The change in the state of the secondary battery 10 caused by the ripple temperature increase operation, that is, the amount of variation in the temperature and the amount of variation in the SOC, are determined based on the frequency of the ripple current (hereinafter also referred to as the "ripple frequency") caused to flow during the ripple temperature increase operation and the duration, for which the ripple temperature increase operation is performed.

In the first embodiment, the values of the allowable output power Wout shown in FIG. 9 are prepared in advance in the form of a map and based on this allowable output power map, it is determined whether to perform the ripple temperature increase operation. Specifically, the allowable output power after the temperature is increased is predicted based on the ripple frequency and the duration of the ripple temperature increase operation, and the predicted value is compared with the allowable output power before the ripple temperature increase operation is performed. Then, when the predicted value of the allowable output power after the temperature is increased is equal to or higher than the allowable output power before the temperature is increased, it is determined to perform the ripple temperature increase operation. When the predicted value of the allowable output power after the temperature is increased is lower than the allowable output power before the temperature is increased, it is determined not to perform the ripple temperature increase operation.

Figure 10:
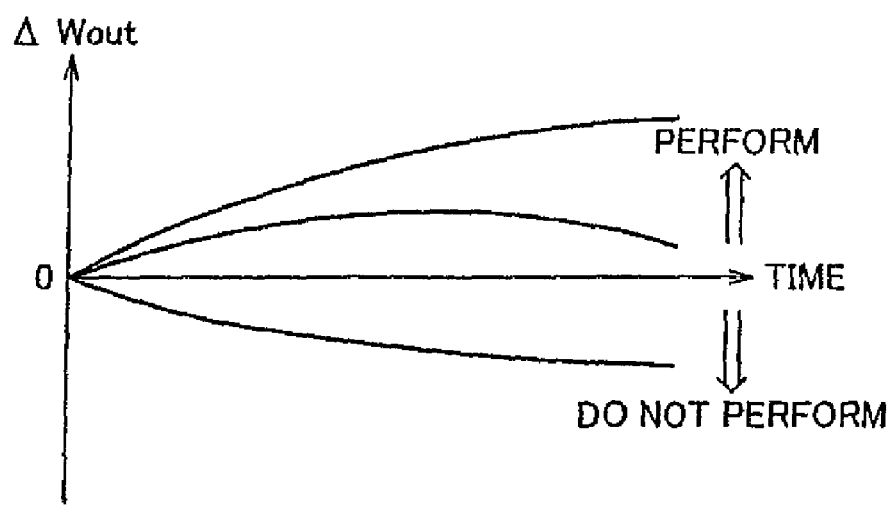
FIG. 10 is a diagram showing some examples of the variation with time of the allowable output power of the secondary battery.

FIG. 10 is a diagram showing some examples of the variation with time of the allowable output power Wout of the secondary battery 10. Referring to FIG. 10, the horizontal axis indicates the duration (time) of the ripple temperature increase operation and the vertical axis indicates the amount of variation ΔWout of the allowable output power Wout. Three examples illustrated correspond to the three vectors represented by the dotted lines in FIG. 9.

When the amount of variation ΔWout of the allowable output power Wout caused by the ripple temperature increase operation is positive, that is, when the ripple temperature increase operation will increase the allowable output power Wout, the ripple temperature increase operation is performed. On the other hand, when the amount of variation ΔWout of the allowable output power Wout caused by the ripple temperature increase operation is negative, that is, when the ripple temperature increase operation will reduce the allowable output power Wout, the ripple temperature increase operation is not performed.

Figure 11:
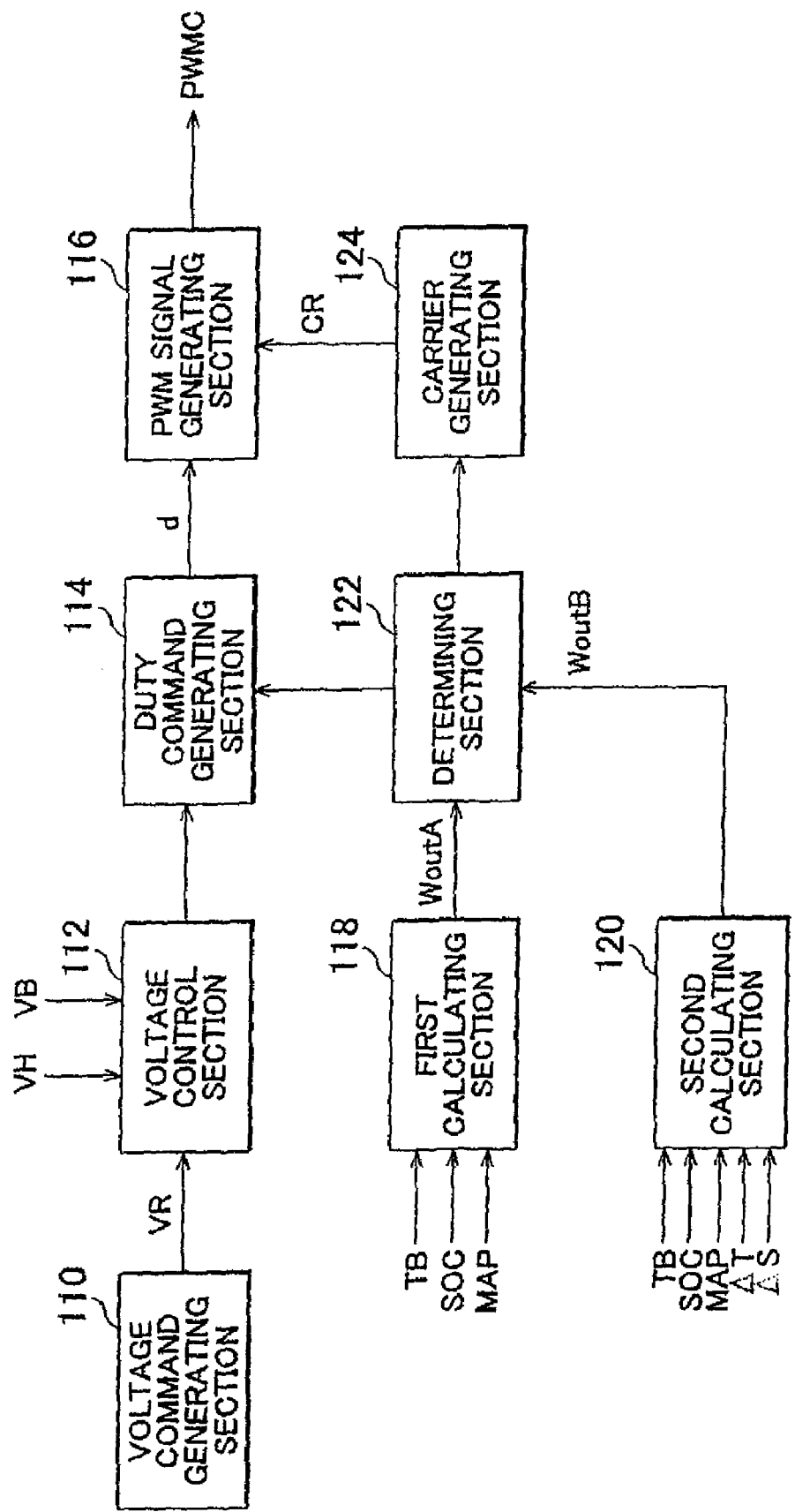
FIG. 11 is a functional block diagram of part of the ECU shown in FIG. 7, the part relating to control of the boost converter.

FIG. 11 is a functional block diagram of part of the ECU 70 shown in FIG. 7, the part relating to the control of the boost converter 22. Referring to FIG. 11, the ECU 70 includes a voltage command generating section 110, a voltage control section 112, a duty command generating section 114, a pulse width modulation (PWM) signal generating section 116, a first calculating section 118, a second calculating section 120, a determining section 122, and a carrier generating section 124.

The voltage command generating section 110 generates a voltage command value VR that is the target value of the voltage VH controlled by the boost converter 22. For example, the voltage command generating section 110 generates a voltage command value VR based on the power of the motor generators 56 and 58 calculated from the torque command values and the motor speeds of the motor generators 56 and 58.

The voltage control section 112 receives the voltage command value VR from the voltage command generating section 110 and receives the detected values of the voltages VH and VB from the voltage sensors 88 and 86, respectively. The voltage control section 112 performs the control operation (proportional integral control, for example) to make the voltage VH equal to the voltage command value VR.

The duty command generating section 114 generates the duty command value d that indicates the switching duty factors of the switching devices Q1 and Q2 of the boost converter 22 based on the output for control from the voltage control section 112. When the duty command generating section 114 receives, from the determining section 122, the result of determination to the effect that the ripple temperature increase operation on the secondary battery 10 is to be performed, the duty command generating section 114 sets the duty command value d to a predetermined value (0.5 (boost ratio is 2), for example) for the ripple temperature increase operation, irrespective of the output for control from the voltage control section 112.

The PWM signal generating section 116 compares the duty command value d received from the duty command generating section 114, with the carrier signal CR received from the carrier generating section 124 and generates the control signal PWMC, in which the logical status varies depending on the result of comparison. The PWM signal generating section 116 then outputs the generated control signal PWMC to the switching devices Q1 and Q2 of the boost converter 22.

The first calculating section 118 receives the temperature TB of the secondary battery 10 detected by the temperature sensor 82 and the SOC of the secondary battery 10. The SOC of the secondary battery 10 is calculated based on the detected values of the electric current IB and the voltage VB, etc. with the use of various, publicly known methods. The first calculating section 118 reads the allowable output power map MAP of the secondary battery 10 shown in FIG. 9 from a storage section, the allowable output power map being prepared in advance in the storage section, such as a read only memory (ROM) (not shown).

The first calculating section 118 then calculates the current allowable output power WoutA of the secondary battery 10 based on the temperature TB and the SOC of the secondary battery 10 with the use of the allowable output power map MAP. Specifically, the allowable output power WoutA is the allowable output power of the secondary battery 10 before the ripple temperature increase operation is performed.

The second calculating section 120 receives the temperature TB and the SOC of the secondary battery 10 and reads the allowable output power map MAP from the storage section. The second calculating section 120 receives the temperature variation amount ΔT (amount of increase in temperature) and the SOC variation amount ΔS (amount of reduction in SOC) of the secondary battery 10 caused when the ripple temperature increase operation is performed. Note that the temperature variation amount ΔT and the SOC variation amount ΔS are determined based on the ripple frequency and the duration of the ripple temperature increase operation and these amounts may be calculated in the second calculating section 120 based on the ripple frequency and the duration of the ripple temperature increase operation.

The second calculating section 120 calculates (predicts) the allowable output power WoutB of the secondary battery 10 achieved when the ripple temperature increase operation is performed, based on the temperature variation amount ΔT and the SOC variation amount ΔS with the use of the allowable output power map MAP.

The determining section 122 receives the allowable output power WoutA from the first calculating section 118 and receives the allowable output power WoutB from the second calculating section 120. When the allowable output power WoutB is equal to or higher than the allowable output power WoutA, the determining section 122 determines to actually perform the ripple temperature increase operation. On the other hand, when the allowable output power WoutB is lower than the allowable output power WoutA, the determining section 122 determines not to perform the ripple temperature increase operation. The determining section 122 sends the result of determining whether to perform the ripple temperature increase operation, to the duty command generating section 114 and the carrier generating section 124.

The carrier generating section 124 generates the carrier signal CR (triangular wave) for generating the PWM signal in the PWM signal generating section 116 and outputs the generated carrier signal CR to the PWM signal generating section 116. When the result of determination to the effect that the ripple temperature increase operation on the secondary battery 10 is to be performed is received from the determining section 122, the carrier generating section 124 generates the carrier signal CR having the ripple frequency (1 kHz based on FIG. 3, for example) and outputs the generated carrier signal CR to the PWM signal generating section 116.

Figure 12:
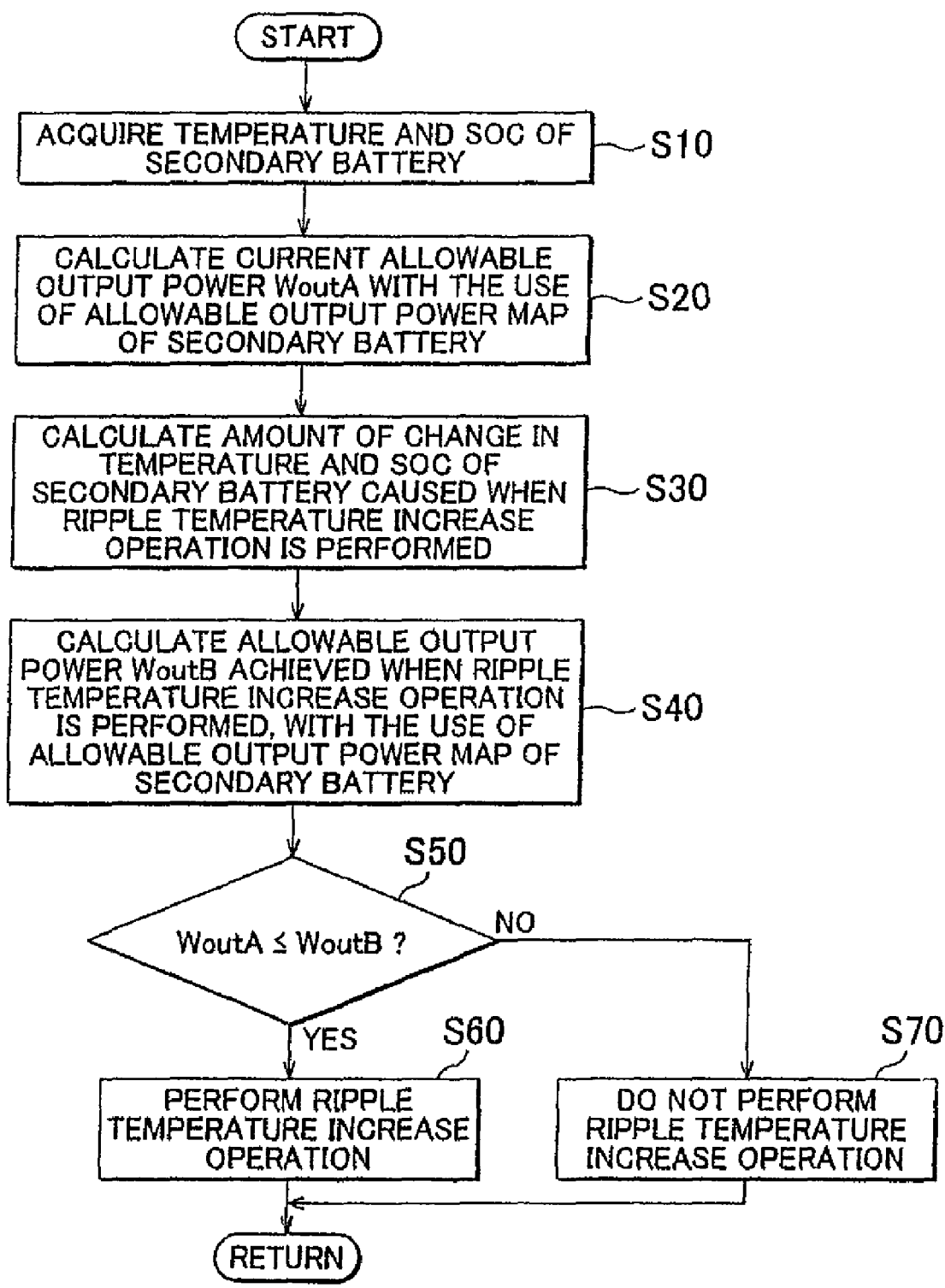
FIG. 12 is a flow chart for explaining a procedure of determination, performed by the ECU shown in FIG. 7, as to whether to perform the ripple temperature increase operation.

FIG. 12 is a flow chart for explaining a procedure of determination, performed by the ECU 70 shown in FIG. 7, as to whether to perform the ripple temperature increase operation. A series of steps shown in this flow chart is called by the main routine and executed when it is requested to perform the ripple temperature increase operation because, for example, the temperature TB of the secondary battery 10 falls below the predetermined value.

Referring to FIG. 12, the ECU 70 acquires the temperature TB and the SOC of the secondary battery 10 (step S10). The temperature TB is detected by the temperature sensor 82 and the SOC is calculated based on the electric current IB detected by the electric current sensor 84 and on the voltage VB detected by the voltage sensor 86.

Then, the ECU 70 calculates the current allowable output power WoutA based on the temperature TB and the SOC, acquired in step S10, with the use of the allowable output power MAP of the secondary battery 10, which has been prepared in advance (step S20). Subsequently, the ECU 70 calculates the amount of variation in temperature and the amount of variation in SOC of the secondary battery 10 when the ripple temperature increase operation is performed (step S30). Note that as described above, the amount of variation in temperature and the amount of variation in SOC are determined based on the ripple frequency and the duration of the temperature increase operation and the ECU 70 calculates these amounts of variation based on the ripple frequency and the duration of the temperature increase operation, which are determined in advance.

The ECU 70 then calculates the'allowable output power WoutB achieved when the ripple temperature increase operation is performed, based on the amount of variation in temperature and the amount of variation in SOC calculated in step S30 with the use of the allowable output power map MAP again (step S40).

The ECU 70 then determines whether the allowable output power WoutB calculated in step S40 is equal to or higher than the allowable output power WoutA calculated in step S20 (step S50). When it is determined that the allowable output power WoutB is equal to or higher than the allowable output power WoutA (YES in step S50), the ECU 70 controls the boost converter 22 to actually perform the ripple temperature increase operation (step S60). On the other hand, when it is determined in step S50 that the allowable output power WoutB is lower than the allowable output power WoutA (NO in step S50), the ECU 70 determines not to perform the ripple temperature increase operation (step S70).

As described above, in the first embodiment, the allowable output power WoutB achieved when the ripple temperature increase operation is performed is predicted with the use of the allowable output power map of the secondary battery 10 and is compared with the allowable output power WoutA before the ripple temperature increase operation is performed. When the allowable output power WoutB is equal to or higher than the allowable output power WoutA, it is determined to perform the ripple temperature increase operation. On the other hand, when the allowable output power WoutB is lower than the allowable output power WoutA, it is determined not to perform the ripple temperature increase operation. Accordingly, even when it is expected that the temperature of the secondary battery 10 will be increased, the temperature increase operation on the secondary battery 10 is not performed when the allowable output power will be reduced. Thus, according to the first embodiment, the temperature of the secondary battery 10 is efficiently increased with the use of the heat generated by the internal resistance 12 of the secondary battery 10.

As described with reference to FIGS. 9 and 10, the allowable output power Wout achieved when the ripple temperature increase operation is performed varies depending on the ripple frequency. Thus, it is preferable that the secondary battery temperature-increasing control apparatus further include a frequency selecting section that selects the ripple frequency f based on the value of the allowable output power Wout achieved when the ripple temperature increase operation is performed. With this configuration, it is possible to perform the ripple temperature increase operation in a better way such that the allowable output power Wout achieved when the ripple temperature increase operation is performed becomes relatively higher, for example. Thus, it becomes possible to increase the temperature of the secondary battery more efficiently and effectively. Embodiments having the frequency selecting section will be described below.

Second Embodiment

In the second embodiment, a ripple frequency is selected, at which the allowable output power WoutB of the secondary battery 10 achieved when the ripple temperature increase operation is performed becomes maximum.

An overall configuration of a hybrid vehicle, in which a secondary battery temperature-increasing control apparatus according to the second embodiment is used, is the same as that of the hybrid vehicle 100 shown in FIG. 7.

Figure 13:
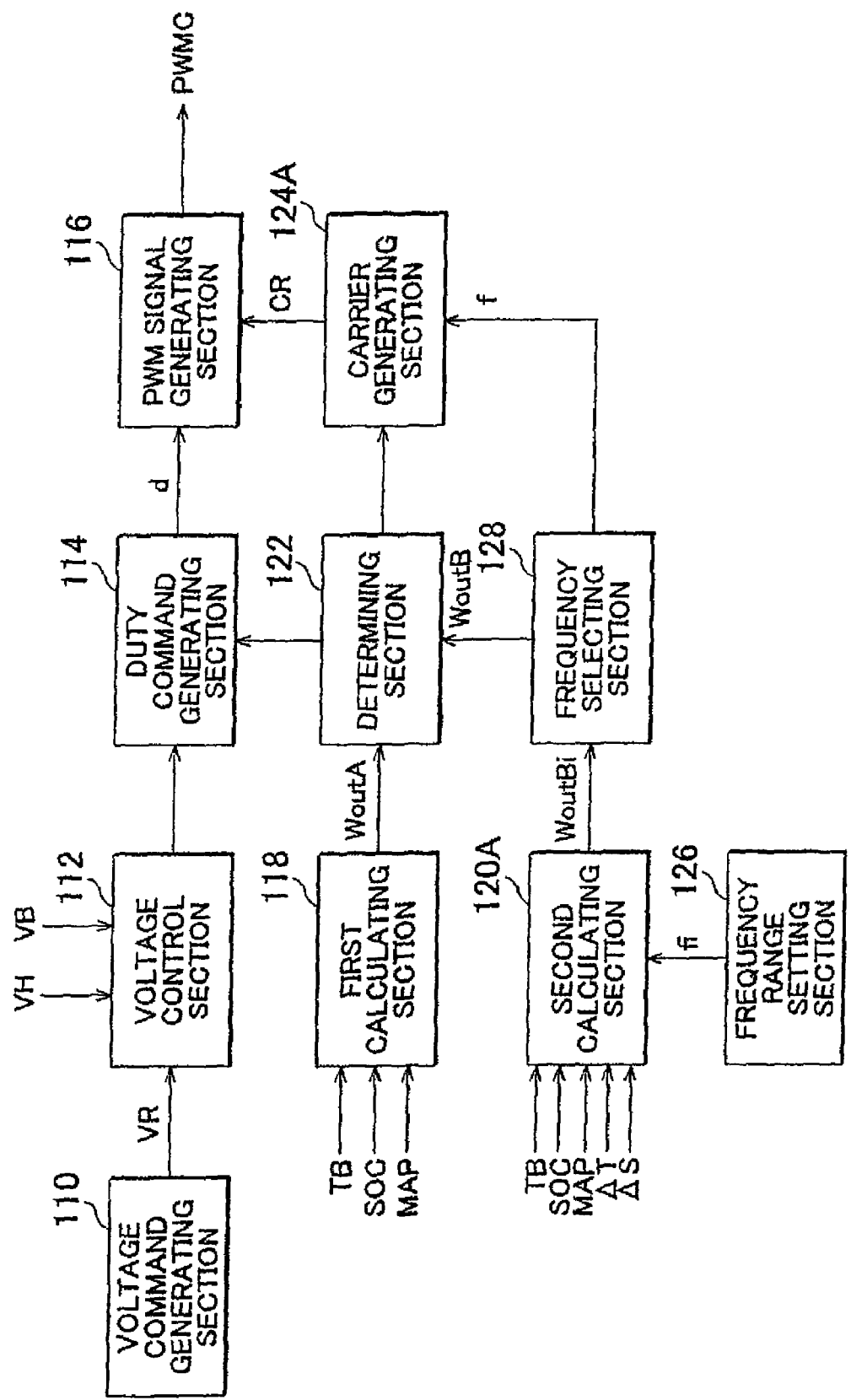
FIG. 13 is a functional block diagram of part of an ECU of a second embodiment, the part relating to control of the boost converter.

FIG. 13 is a functional block diagram of part of the ECU 70A of the second embodiment, the part relating to the control of the boost converter 22. Referring to FIG. 13, the ECU 70A further includes a frequency range setting section 126 and a frequency selecting section 128 in addition to the components of the ECU 70 shown in FIG. 11. In addition, the ECU 70A includes a second calculating section 120A and a carrier generating section 124A instead of the second calculating section 120 and the carrier generating section 124.

The frequency range setting section 126 sets the range of the ripple frequency, at which the ripple temperature increase operation can be performed. The range of the ripple frequency is determined based on the lifetime of the secondary battery 10, the upper and lower limit voltages, the maximum electric current, etc., for example. The frequency range setting section 126 discretizes the range of the frequency into a predetermined number of frequencies (or at predetermined intervals) and outputs the frequencies fi to the second calculating section 120A.

For each of the frequencies fi received from the frequency range setting section 126, the second calculating section 120A calculates (predicts) the allowable output power WoutBi of the secondary battery 10 achieved when the ripple temperature increase operation is performed for a predetermined period of time, based on the temperature variation amount $\Delta T$ and the SOC variation amount $\Delta S$ of the secondary battery 10 that occur when the ripple temperature increase operation is performed, with the use of the allowable output power map MAP as in the case of the second calculating section 120 shown in FIG. 11.

The frequency selecting section 128 selects, as the ripple frequency f, the frequency, at which the allowable output power WoutBi received from the second calculating section 120A becomes maximum. The frequency selecting section 128 then outputs the selected ripple frequency f to the carrier generating section 124A and outputs the allowable output power corresponding to the selected frequency to the determining section 122 as the allowable output power WoutB.

The carrier generating section 124A generates the carrier signal CR for generating the PWM signal in the PWM signal generating section 116 and outputs the generated carrier signal CR to the PWM signal generating section 116. When the result of determination to the effect that the ripple temperature increase operation on the secondary battery 10 is to be performed is received from the determining section 122, the carrier generating section 124A generates the carrier signal CR having the ripple frequency f received from the frequency selecting section 128 and outputs the generated carrier signal CR to the PWM signal generating section 116.

Note that the ECU 70A is the same as the ECU 70 of the first embodiment described with reference to FIG. 11, except the above.

Figure 14:
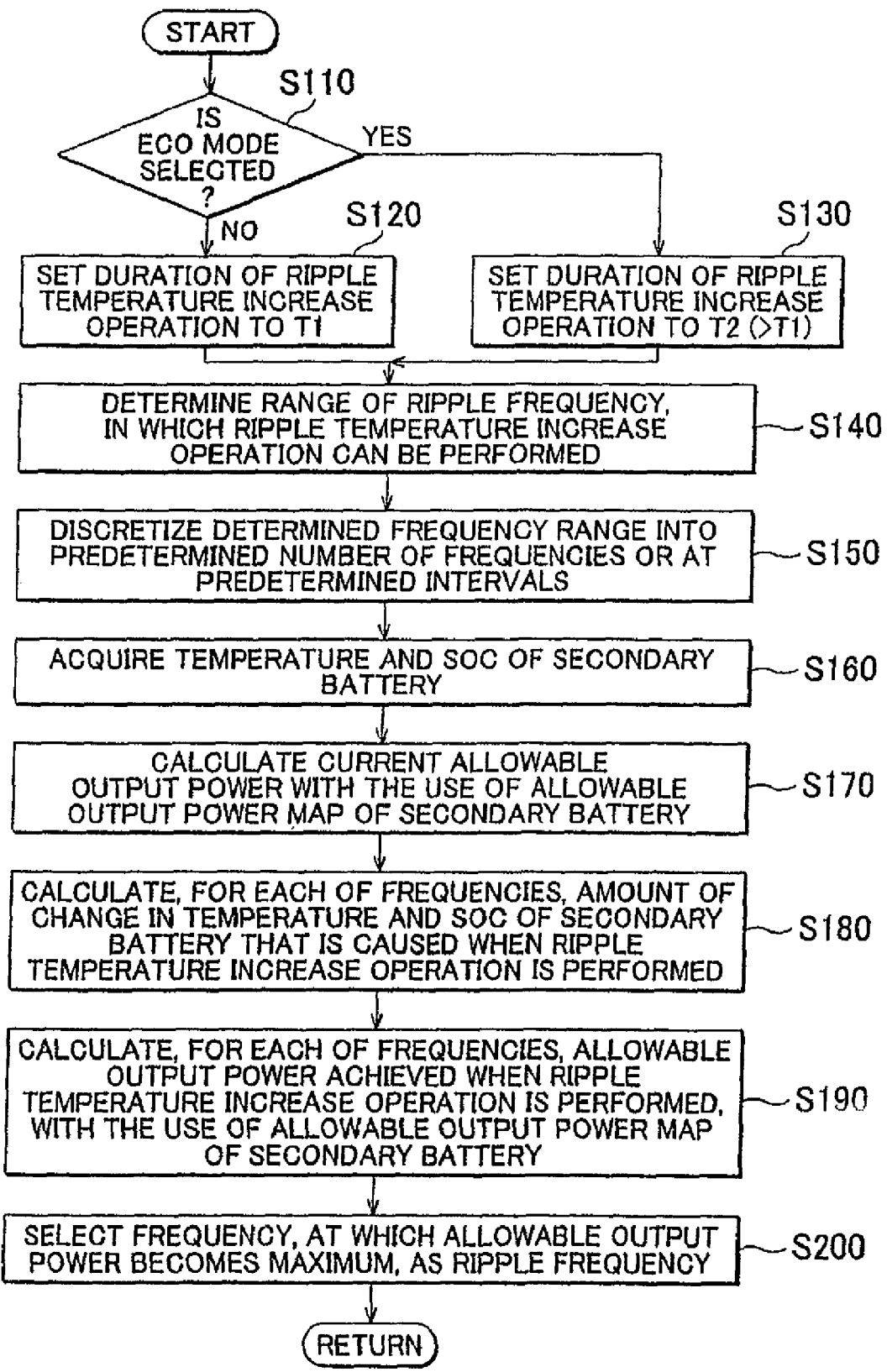
FIG. 14 is a flow chart for explaining a procedure of selection of the ripple frequency performed by the ECU of the second embodiment.

FIG. 14 is a flow chart for explaining a procedure of selection of the ripple frequency performed by the ECU 70A of the second embodiment. Note that a series of steps shown in this flow chart is also called by the main routine and executed when it is requested to perform the ripple temperature increase operation.

Referring to FIG. 14, the ECU 70A determines whether the ECO mode is currently selected (step S110). The ECO mode is a drive mode, in which weight is given to the improvement of the energy efficiency rather than the driving response of the vehicle. The driver can select the ECO mode with the use of a switch. When it is determined in step S110 that the ECO mode is not selected (NO in step S110), the duration of the ripple temperature increase operation is set to T1 (step S120). When it is determined that the ECO mode is selected (YES in step S110), the duration of the ripple temperature increase operation is set to T2 (>T1) (step S130).

Once the duration of the ripple temperature increase operation is set, the ECU 70A sets the range of the ripple frequency, in which the ripple temperature increase operation can be performed (step S140). Subsequently, the ECU 70A discretizes the set frequency range into a predetermined number of frequencies (or at predetermined intervals) (step S150).

Subsequently, the ECU 70A acquires the temperature TB and the SOC of the secondary battery 10 (step S160). The ECU 70A then calculates the current allowable output power WoutA of the secondary battery 10 based on the temperature TB and the SOC acquired in step S160, with the use of the allowable output power map MAP prepared in advance (step S170).

The ECU 70A then calculates, for each of the frequencies, the temperature variation amount ΔT and the SOC variation amount ΔS of the secondary battery 10 that occur when the ripple temperature increase operation is performed for the duration set in step S120 or S130, based on the temperature variation amount and the SOC variation amount of the secondary battery 10 that occur when the ripple temperature increase operation is performed and that are compiled in a map in advance for each of the frequencies (step S180).

Next, the ECU 70A calculates (predicts), for each of the frequencies, the allowable output power WoutBi of the secondary battery 10 achieved when the ripple temperature increase operation is performed, based on the temperature variation amount ΔT and the SOC variation amount ΔS calculated for each of the frequencies in step S180, with the use of the allowable output power map MAP (step S190). The ECU 70A then selects, as the ripple frequency f, the frequency, at which the allowable output power WoutBi calculated for each of the frequencies becomes maximum (step S200).

As described above, in the second embodiment, the ripple frequency is selected, at which the allowable output power WoutB of the secondary battery 10 achieved when the ripple temperature increase operation is performed becomes maximum. Thus, according to the second embodiment, it is possible to efficiently and effectively increase the temperature of the secondary battery 10 with the use of the heat generated by the internal resistance 12 of the secondary battery 10.

(Modification)

In the above second embodiment, the duration of the ripple temperature increase operation is specified and the frequency, at which the allowable output power WoutBi achieved when the ripple temperature increase operation is performed for this duration becomes maximum, is selected as the ripple frequency. In this modification, the frequency, at which the peak value of the allowable output power WoutBi becomes maximum, is selected as the ripple frequency and the time taken until the peak value is reached is set as the duration of the ripple temperature increase operation.

Figure 15:
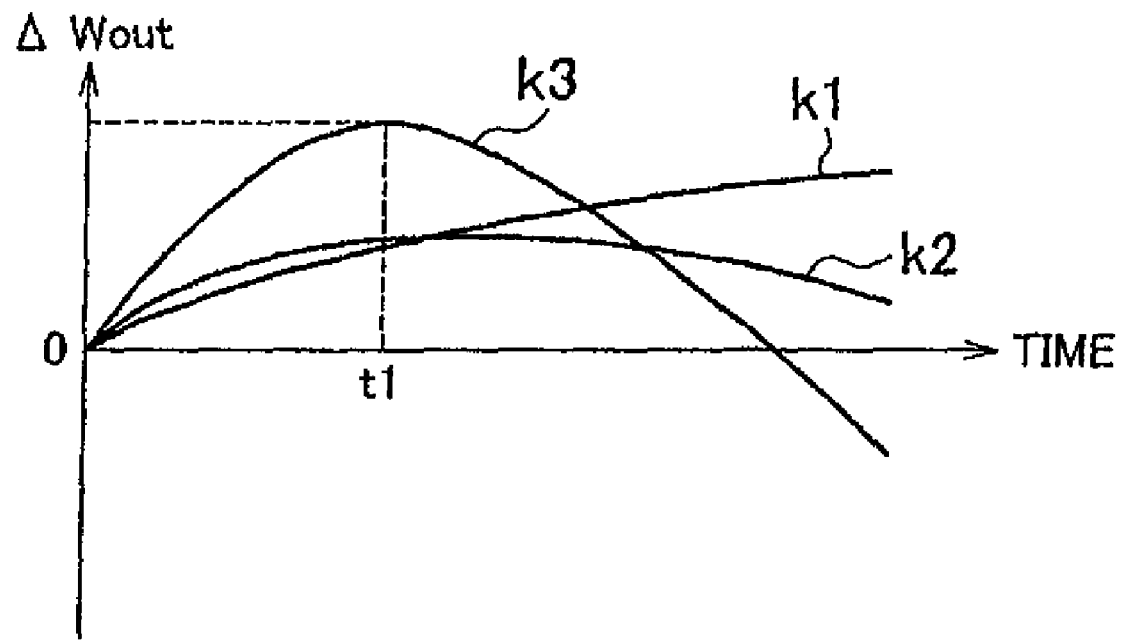
FIG. 15 is a diagram showing some examples of the variation with time of the allowable output power of the secondary battery.

FIG. 15 is a diagram showing some examples of the variation with time of the allowable output power Wout of the secondary battery 10. Referring to FIG. 15, the curves k1 to k3 show the variation with time of the allowable output power in the cases where the ripple frequencies differ from each other.

In the case of the curve k3, when the duration of the ripple temperature increase operation increases, the SOC is reduced and the allowable output power is therefore reduced, so that the variation amount ΔWout of the allowable output power becomes negative. However, the variation amount ΔWout in the case of the curve k3 becomes maximum among the curves k1 to k3 at time t1. In this modification, the frequency corresponding to the curve k3 is set as the ripple frequency and the time period from zero to t1 is set as the duration of the ripple temperature increase operation.

Figure 16:
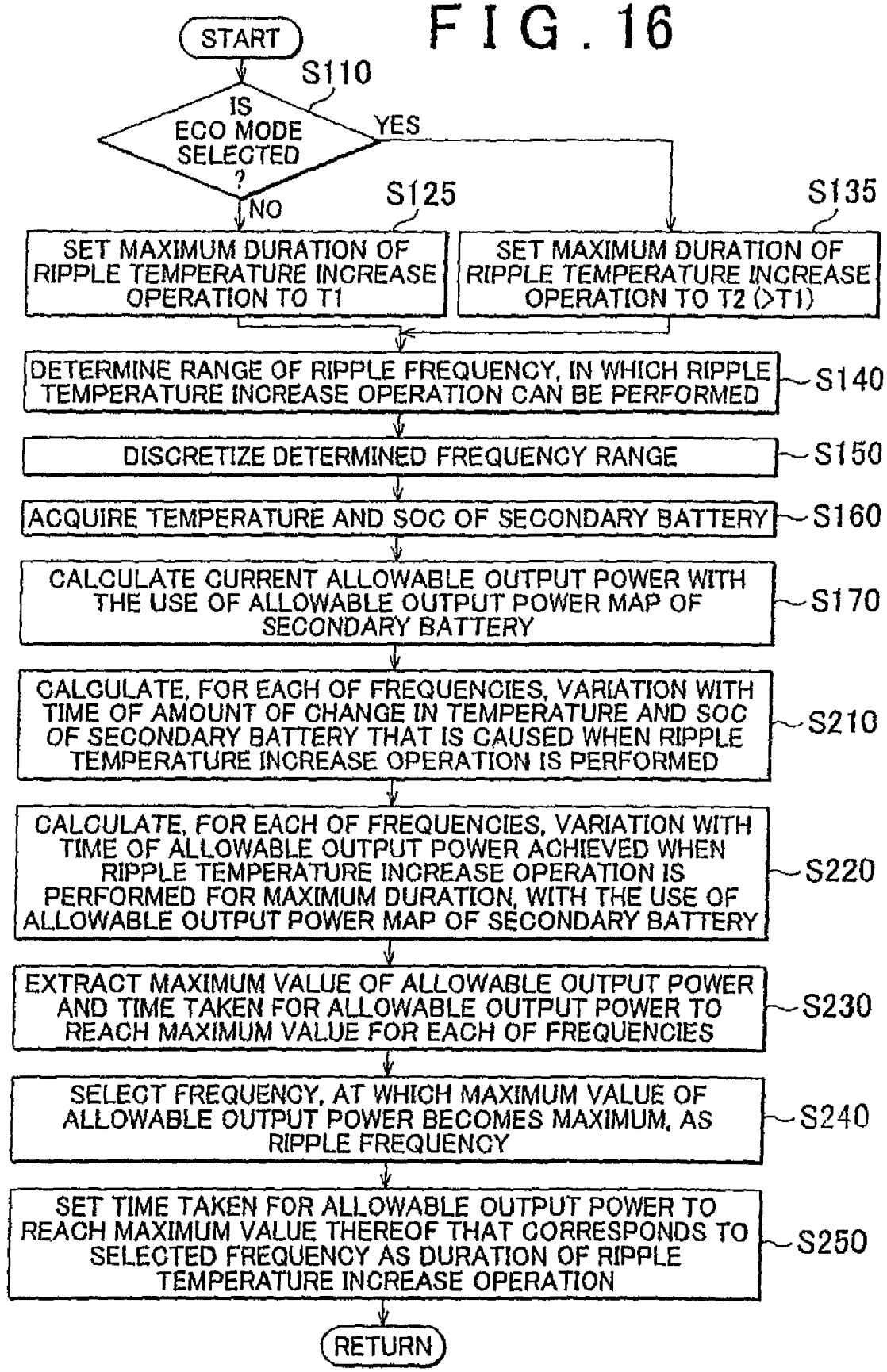
FIG. 16 is a flow chart for explaining a procedure of selection of the ripple frequency according to a modification of the second embodiment.

FIG. 16 is a flow chart for explaining a procedure of selection of the ripple frequency according to the modification of the second embodiment. Note that a series of steps shown in this flow chart is also called by the main routine and executed when it is requested to perform the ripple temperature increase operation.

Referring to FIG. 16, the flow chart includes steps S125 and S135, instead of steps S120 and S130, respectively, of the flow chart shown in FIG. 14 and includes steps S210 to S250, instead of steps S180 to S200, respectively, of the flow chart shown in FIG. 14.

When it is determined in step S110 that the ECO mode is not selected (NO in step S110), the maximum duration of the ripple temperature increase operation is set to T41 (step S125). When it is determined that the ECO mode is selected (YES in step S110), the maximum duration of the ripple temperature increase operation is set to T2 (>T1) (step S135).

When the current allowable output power WoutA of the secondary battery 10 is calculated in step S170, the ECU 70A calculates, for each of the frequencies, the variation with time of the temperature variation amount ΔT and the SOC variation amount ΔS of the secondary battery 10 that occur when the ripple temperature increase operation is performed for the maximum duration set in step S125 or S135, based on the temperature variation amount and the SOC variation amount of the secondary battery 10 that occur when the ripple temperature increase operation is performed and that are compiled in a map in advance for each of the frequencies (step S210).

Subsequently, the ECU 70A calculates (predicts), for each of the frequencies, the variation with time of the allowable output power WoutBi achieved when the ripple temperature increase operation is performed for the maximum duration set in step S125 or S135, based on the temperature variation amount ΔT and the SOC variation amount ΔS calculated for each of the frequencies in step S210, with the use of the allowable output power map MAP (step S220).

Next, the ECU 70A extracts the maximum value of the allowable output power WoutBi and the time taken for the allowable output power WoutBi to reach the maximum value for each of the frequencies (step S230). The ECU 70A then selects, as the ripple frequency f, the frequency, at which the maximum value of the allowable output power WoutBi becomes maximum (step S240). In addition, the ECU 70A sets, as the duration of the ripple temperature increase operation, the time taken for the allowable output power WoutBi to reach the maximum value that corresponds to the selected frequency (step S250).

As described above, in the modification of the second embodiment, the frequency, at which the peak value of the allowable output power Wout becomes maximum, is selected as the ripple frequency and the time taken for the allowable output power WoutBi to reach the peak value is set as the duration of the ripple temperature increase operation. Thus, according to the modification, it is possible to efficiently and effectively increase the temperature of the secondary battery 10.

Third Embodiment

In the second embodiment and the modification thereof, the ripple frequency is selected so that the allowable output power Wont of the secondary battery 10 achieved when the ripple temperature increase operation is performed becomes maximum. In a third embodiment, however, the frequency, at which it is ensured that the electric power required to start the engine 60 (FIG. 7) with the motor generator 56 (FIG. 7) is obtained, is selected as the ripple frequency. When the allowable output power WoutB corresponding to the selected ripple frequency is equal to or higher than the allowable output power WoutA, it is determined to perform the ripple temperature increase operation and, when the allowable output power WoutB is lower than the allowable output power WoutA, it is determined not to perform the ripple temperature increase operation.

Figure 17:
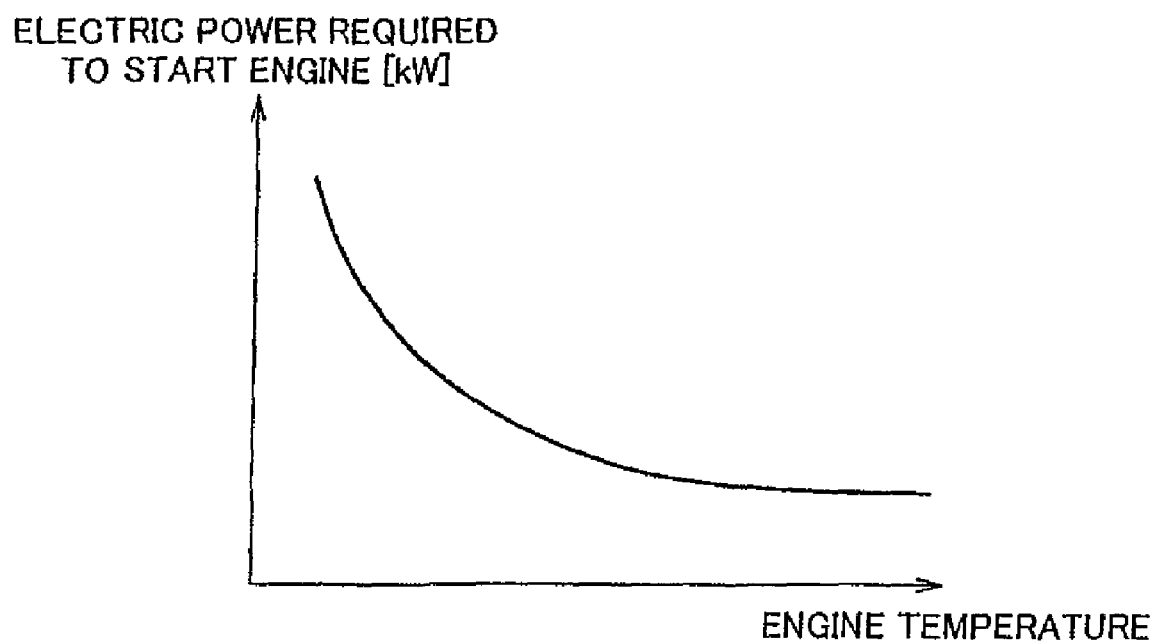
FIG. 17 is a diagram showing the relation between the electric power required to start an engine and the temperature of the engine.

FIG. 17 is a diagram showing the relation between the electric power required to start the engine and the temperature of the engine. Referring to FIG. 17, the electric power (kW) required to start the engine 60 with the motor generator 56 increases as the temperature of the engine decreases. Thus, in the third embodiment, with the use of the map shown in FIG. 17, the electric power required to start the engine 60 with the motor generator 56 is calculated based on the temperature of the engine and the frequency, at which it is ensured that the calculated electric power required to start the engine is obtained, is selected as the ripple frequency.

An overall configuration of a hybrid vehicle, in which a secondary battery temperature-increasing control apparatus according to the third embodiment is used, is the same as that of the hybrid vehicle 100 shown in FIG. 7.

Figure 18:
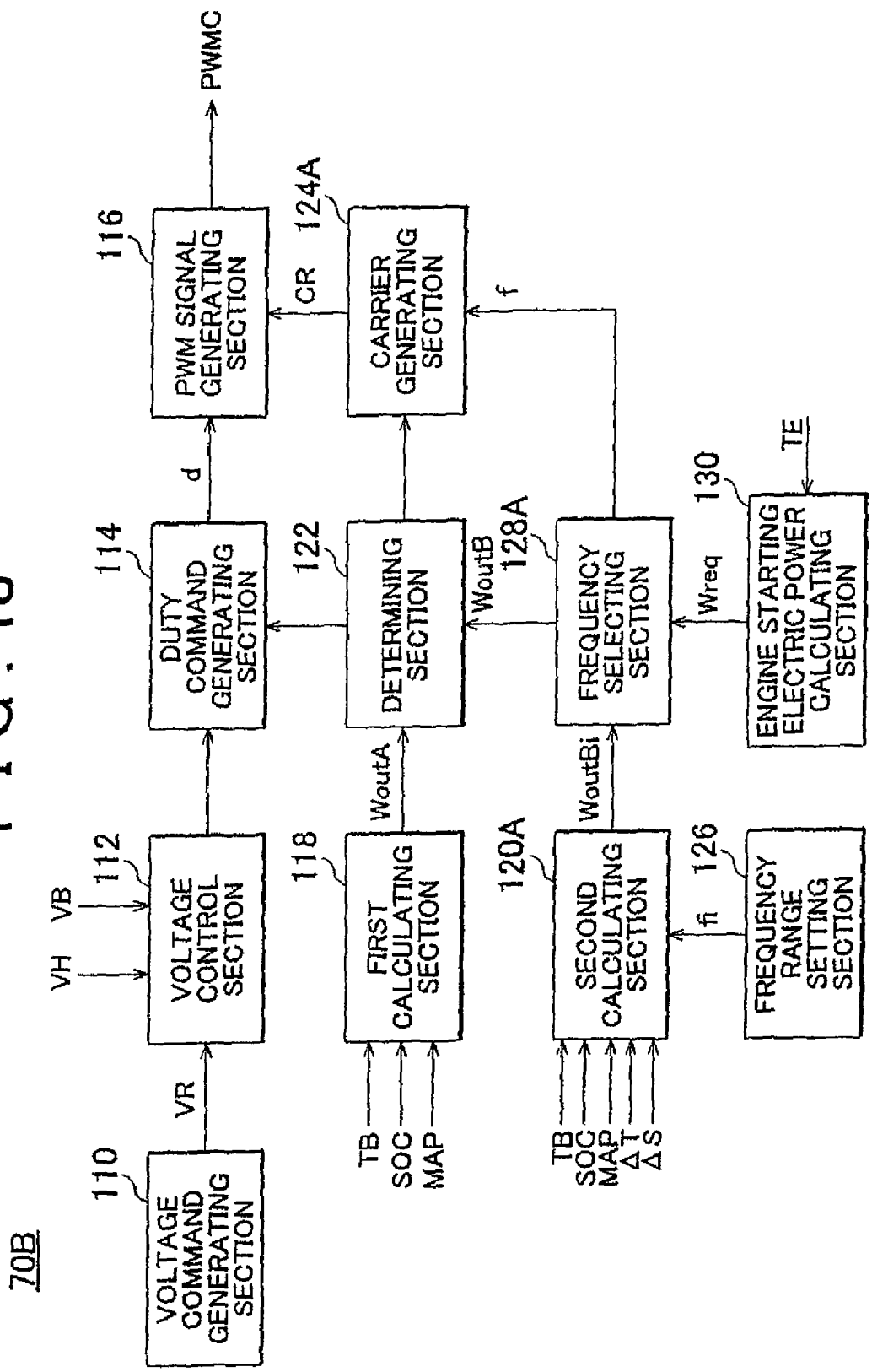
FIG. 18 is a functional block diagram of part of an ECU of a third embodiment, the part relating to control of the boost converter.

FIG. 18 is a functional block diagram of part of the ECU 70B of the third embodiment, the part relating to the control of the boost converter 22. Referring to FIG. 18, the ECU 70B includes a voltage command generating section 110, a voltage control section 112, a duty command generating section 114, a PWM signal generating section 116, a first calculating section 118, a determining section 122, an engine starting electric power calculating section 130, a frequency selecting section 128A, a carrier generating section 124A, a second calculating section 120A, and a frequency range setting section 126.

The engine starting electric power calculating section 130 calculates the electric power Wreq (kW) required to start the engine 60 with the motor generator 56 based on the temperature TE of the engine 60 detected by the temperature sensor 90 (FIG. 7), with the use of the map shown in FIG. 17 prepared in advance.

The frequency selecting section 128A receives the electric power Wreq from the engine starting electric power calculating section 130 and receives the allowable output power WoutBi from the second calculating section 120A. When there is the allowable output power WoutBi equal to or higher than the electric power Wreq, the frequency selecting section 123A selects the frequency corresponding to the allowable output power WoutBi as the ripple frequency. When there are a plurality of allowable output powers WoutBi equal to or higher than the electric power Wreq, the frequency that renders the duration of the ripple temperature increase operation short, the frequency that renders the amount of reduction of the SOC small, etc. may be selected as the ripple frequency.

The frequency selecting section 128A outputs the selected ripple frequency f to the carrier generating section 124A and outputs the allowable output power corresponding to the selected frequency to the determining section 122 as the allowable output power WoutB.

Figure 19:
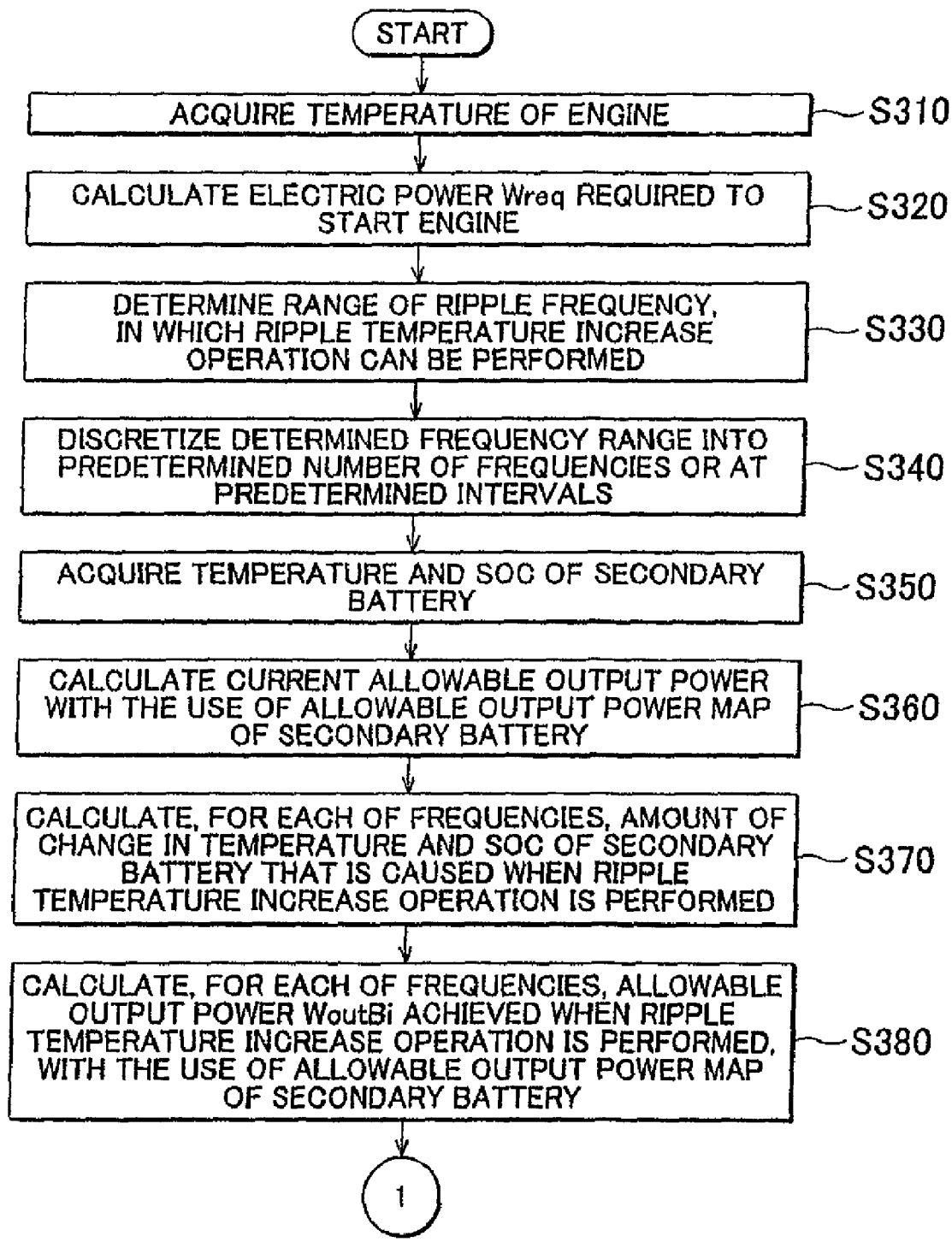
FIG. 19 shows a flow chart for explaining a procedure of selection of the ripple frequency performed by the ECU of the third embodiment.
Figure 20:
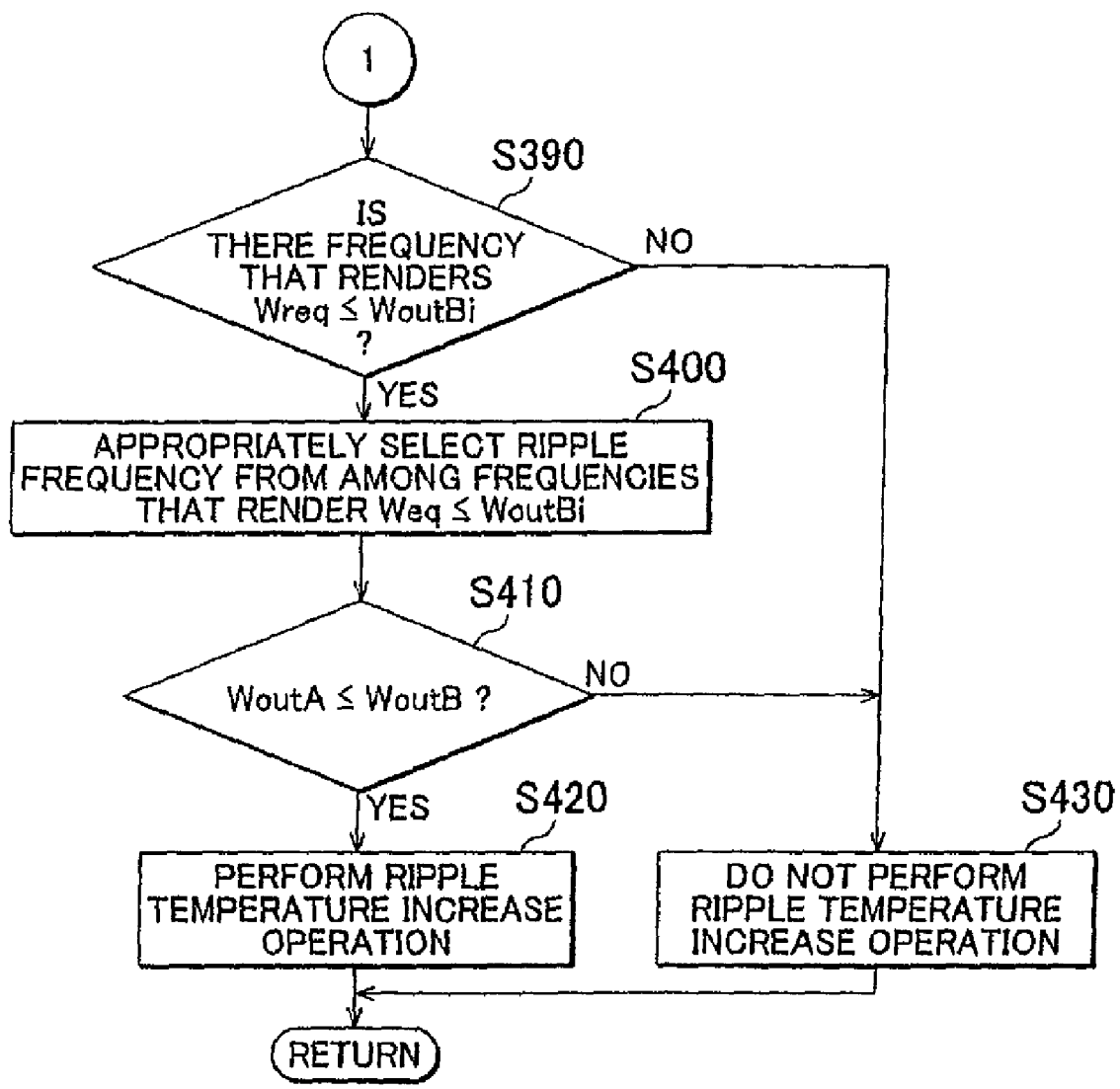
FIG. 20 shows the flow chart for explaining the procedure of selection of the ripple frequency performed by the ECU of the third embodiment.

The other components of the ECU 70B have already been described and the description thereof is not repeated. FIGS. 19 and 20 show a flow chart for explaining a procedure of selection of the ripple frequency performed by the ECU 70B of the third embodiment. Note that a series of steps shown in this flow chart is also called by the main routine and executed when it is requested to perform the ripple temperature increase operation.

Referring to FIG. 19, the ECU 70B acquires the temperature TE of the engine 60 (FIG. 7) from the temperature sensor 90 (FIG. 7) (step S310). The ECU 7013 then calculates the electric power Wreq required to start the engine 60 with the motor generator 56 (FIG. 7), based on the temperature TE with the use of the map shown in FIG. 17 prepared in advance (step S320). Note that steps S330 to S380 are the same as steps S140 to S190, respectively, shown in FIG. 14 and steps S410 to S430 are the same as steps S50 to S70, respectively, shown in FIG. 12 and therefore, the description thereof is not repeated.

When the allowable output power WoutBi of the secondary battery 10 achieved when the ripple temperature increase operation is performed is calculated (predicted) for each of the frequencies in step S380, the ECU 7013 determines whether there is a frequency that renders WoutBi equal to or greater than Wreq (Wreq≦WoutBi) (step S390). When it is determined that there is a frequency that renders Wreq≦WoutBi (YES in step S390), the ECU 7013 appropriately selects the ripple frequency from among the frequencies that render Wreq≦WoutBi (step S400). Then, the ECU 7013 outputs the allowable output power corresponding to the selected frequency to the determining section 122 as the allowable output power WoutB. On the other hand, when it is determined that there is no frequency that renders Wreq≦WoutBi (NO in step S390), the ECU 70B determines not to perform the ripple temperature increase operation (step S430).

As described above, in the third embodiment, the frequency, at which it is ensured that the electric power Wreq required to start the engine 60 with the motor generator 56 is obtained, is selected as the ripple frequency. Specifically, the frequency, at which the minimum necessary electric power can be obtained, is selected as the ripple frequency. Thus, according to the third embodiment, it is possible to prevent the temperature of the secondary battery 10 from being unnecessarily increased and it is possible to efficiently increase the temperature of the secondary battery 10.

In the above embodiments, description has been made of a series/parallel hybrid vehicle, in which the motive power from the engine 60 is split by the power splitting mechanism 62 and transmitted to the driving wheel 64 and the motor generator 56, as the hybrid vehicle, in which the secondary battery temperature-increasing control apparatus is used. The invention however can be applied to other types of hybrid vehicles. For example, the invention can be applied to a so-called series hybrid vehicle, in which the engine 60 is used solely to drive the motor generator 56 and the driving force of the vehicle is generated only by the motor generator 56, a hybrid vehicle, in which only the regenerated energy out of the kinetic energy generated by the engine 60 is recovered in the form of electric energy, and a motor-assisted hybrid vehicle, in which the engine is used as the main power source and a motor provides assisting force as needed.

The above first and second embodiments can be applied to the electric vehicle that is not provided with the engine 60 and driven only by the electric power and to the fuel cell vehicle that includes, as the direct current power source, a fuel cell in addition to the secondary battery 10. The third embodiment can also be applied to the fuel cell vehicle that is provided with a fuel cell in addition to the secondary battery 10.

The boost converter 22 and the capacitor CH are an example of the "ripple generating device" of the invention. The first calculating section 118 is an example of the "first calculating section" of the invention. The second calculating sections 120 and 120A are an example of the "second calculating section" of the invention. The engine 60 is an example of the "internal combustion engine" of the invention.

It should be understood that the embodiments described above are for illustration purpose only and not intended to be restrictive. The scope of the invention is defined not by the above description of the embodiments but by the claims and it is intended to include all modifications within the scope of the claims and the equivalent thereof.

The invention claimed is:

1. A secondary battery temperature-increasing control apparatus for increasing a temperature of a secondary battery by controlling a ripple generating device configured to actively cause a ripple current to flow in the secondary battery, the secondary battery temperature-increasing control apparatus comprising:
 a first calculating electronic control unit (ECU) section that calculates a first value indicating an allowable output power of the secondary battery before a temperature increase operation for increasing the temperature of the secondary battery is performed, the allowable output power being determined in advance based on the temperature and a state of charge (SOC) of the secondary battery;
 a second calculating ECU section that calculates a second value indicating the allowable output power achieved when the temperature increase operation on the secondary battery is performed, based on an amount of variation in the temperature and an amount of variation in the SOC that occur when the temperature increase operation on the secondary battery is performed; and
 a determining ECU section that determines whether to perform the temperature increase operation on the secondary battery so that when the second value is equal to or greater than the first value, the temperature increase operation on the secondary battery is performed by controlling the ripple generating device and, when the second value is smaller than the first value, the temperature increase operation on the secondary battery is not performed.

2. The secondary battery temperature-increasing control apparatus according to claim 1, further comprising a frequency selecting ECU section that selects a frequency, at which the second value becomes maximum, as the frequency of the ripple current.

3. The secondary battery temperature-increasing control apparatus according to claim 2, wherein the frequency selecting ECU section selects a frequency, at which the second value when the temperature increase operation on the secondary battery is performed for a predetermined period of time becomes maximum, as the frequency of the ripple current.

4. The secondary battery temperature-increasing control apparatus according to claim 2, wherein the frequency selecting ECU section selects a frequency, at which a peak value of the second value becomes maximum, as the frequency of the ripple current, and a time taken from when the temperature increase operation on the secondary battery is started to when the second value reaches the peak value is set as a duration of the temperature increase operation on the secondary battery.

5. The secondary battery temperature-increasing control apparatus according to claim 1, wherein
 an internal combustion engine can be started with an electric motor with the use of an electric power output from the secondary battery, and
 the temperature-increasing control apparatus further includes a frequency selecting ECU section that selects a frequency, at which it is ensured that the second value is equal to or higher than an electric power required to start the internal combustion engine, as the frequency of the ripple current.

6. The secondary battery temperature-increasing control apparatus according to claim 1, wherein the amount of variation in the temperature and the amount of variation in the SOC that occur when the temperature increase operation on the secondary battery is performed are determined based on the frequency of the ripple current and a duration of the temperature increase operation on the secondary battery.

7. A vehicle comprising:
 a secondary battery that stores electric power to be used to drive the vehicle
 a ripple generating device that is connected to the secondary battery and is configured to actively cause a ripple current to flow in the secondary battery; and
 the secondary battery temperature-increasing control apparatus according to claim 1 for increasing a temperature of the secondary battery by controlling the ripple generating device.

8. A secondary battery temperature-increasing control method of increasing a temperature of a secondary battery by controlling a ripple generating device configured to actively cause a ripple current to flow in the secondary battery, the secondary battery temperature-increasing control method comprising:
 a step of calculating a first value indicating an allowable output power of the secondary battery before a temperature increase operation for increasing the temperature of the secondary battery is performed, the allowable output power being determined in advance based on the temperature and a state of charge (SOC) of the secondary battery;

a step of calculating a second value indicating the allowable output power achieved when the temperature increase operation on the secondary battery is performed, based on an amount of variation in the temperature and an amount of variation in the SOC that occur when the temperature increase operation on the secondary battery is performed; and a step of determining whether to perform the temperature increase operation on the secondary battery so that when the second value is equal to or greater than the first value, the temperature increase operation on the secondary battery is performed by controlling the ripple generating device and, when the second value is smaller than the first value, the temperature increase operation on the secondary battery is not performed.

9. The secondary battery temperature-increasing control method according to claim 8, further comprising a step of selecting a frequency, at which the second value becomes maximum, as the frequency of the ripple current.

10. The secondary battery temperature-increasing control method according to claim 8, wherein an internal combustion engine can be started with an electric motor with the use of an electric power output from the secondary battery, and the temperature-increasing control method further includes a step of selecting a frequency, at which it is ensured that the second value is equal to or higher than an electric power required to start the internal combustion engine, as the frequency of the ripple current.

* * * * *